United States Patent
Kobayashi et al.

(10) Patent No.: US 11,875,587 B2
(45) Date of Patent: Jan. 16, 2024

(54) INFORMATION PROCESSING SYSTEM, INFORMATION PROCESSING METHOD, AND NON-TRANSITORY RECORDING MEDIUM

(71) Applicants: Hiroshi Kobayashi, Kanagawa (JP); Yoshiharu Tojo, Kanagawa (JP); Fumihiro Teshima, Chiba (JP)

(72) Inventors: Hiroshi Kobayashi, Kanagawa (JP); Yoshiharu Tojo, Kanagawa (JP); Fumihiro Teshima, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 202 days.

(21) Appl. No.: 17/146,686

(22) Filed: Jan. 12, 2021

(65) Prior Publication Data

US 2021/0279460 A1    Sep. 9, 2021

(30) Foreign Application Priority Data

Mar. 6, 2020   (JP) ................ 2020-038959

(51) Int. Cl.
  *G06V 30/414*   (2022.01)
  *G06V 30/412*   (2022.01)
  *G06V 30/416*   (2022.01)

(52) U.S. Cl.
  CPC .......... *G06V 30/412* (2022.01); *G06V 30/414* (2022.01); *G06V 30/416* (2022.01)

(58) Field of Classification Search
  CPC .... G06V 30/414; G06V 10/44; G06V 30/416; G06V 30/412
  See application file for complete search history.

(56) References Cited

U.S. PATENT DOCUMENTS 10,241,992 B1 *   3/2019   Middendorf ......... G06V 30/416
2015/0187022 A1 *  7/2015   Takahashi .............. G06Q 40/12
                                                                705/30

FOREIGN PATENT DOCUMENTS

JP         2016-051339        4/2016

OTHER PUBLICATIONS

Chen, Whei-Jen, et al. Implementing Document Imaging and Capture Solutions with IBM Datacap. IBM Redbooks, 2015. (Year: 2015).*
Shahab, Asif, et al. "An open approach towards the benchmarking of table structure recognition systems." Proceedings of the 9th IAPR International Workshop on Document Analysis Systems. 2010. (Year: 2010).*

* cited by examiner

*Primary Examiner* — Amandeep Saini
*Assistant Examiner* — Denise G Alfonso
(74) *Attorney, Agent, or Firm* — IPUSA, PLLC

(57) ABSTRACT

An information processing system includes circuitry. The circuitry causes a terminal apparatus to display a setting screen for setting an extraction area for extracting, from a tabular image, an item value for each of one or more extraction target items. The setting screen displays, on the tabular image, an extraction guide representing the extraction area according to each of the one or more extraction target items. The circuitry further receives an operation of setting a position of the extraction guide on the setting screen.

19 Claims, 30 Drawing Sheets

240

BUSINESS TYPE: RETAIL

CA CORPORATION, CB CORPORATION, CC CORPORATION ···

250
DESCRIPTION DEFINITION DB

251
INDIVIDUAL COMPANY DESCRIPTION
DEFINITION INFORMATION

252
BUSINESS TYPE DESCRIPTION
DEFINITION INFORMATION

253
GENERAL-PURPOSE DESCRIPTION
DEFINITION INFORMATION

| GENERAL-PURPOSE DESCRIPTION DEFINITION INFORMATION | |
|---|---|
| DESCRIPTION ITEM NAME | KEYWORD |
| ARTICLE NAME | ARTICLE, PRODUCT |
| QUANTITY | QUANTITY, AMOUNT, NUMBER OF ITEMS, CASES |
| UNIT PRICE | UNIT PRICE |
| PRICE | PRICE, TOTAL PRICE, SUM TOTAL |
| ORDER NUMBER | ORDER NUMBER, ORDER NO., SLIP NUMBER, SLIP NO. |
| ARTICLE CODE | ARTICLE CODE, ARTICLE NO., ARTICLE NUMBER |

| BUSINESS TYPE DESCRIPTION DEFINITION INFORMATION (RETAIL) | |
|---|---|
| DESCRIPTION ITEM NAME | KEYWORD |
| ARTICLE NAME | NAME OF ARTICLE, PRODUCT NAME |
| QUANTITY | — |
| UNIT PRICE | — |
| PRICE | — |

| INDIVIDUAL COMPANY DESCRIPTION DEFINITION INFORMATION<br>BILLER=CA CORPORATION<br>BILLER PHONE NUMBER =03-xxxx-xxxx<br>BILLER ACCOUNT NUMBER =xxxxxxx | |
|---|---|
| DESCRIPTION ITEM NAME | EXTRACTED INFORMATION |
| ARTICLE NAME | KEYWORD: NAME OF ARTICLE<br>KEYWORD COORDINATES:(385,552),(538,597)<br>CELL COORDINATES:(355,532)-(576,614)<br>COLUMN COORDINATES:(355,532)-(576,955) |
| QUANTITY | - |
| UNIT PRICE | - |
| PRICE | KEYWORD: ARTICLE PRICE<br>KEYWORD COORDINATES:(985,553),(1295,585)<br>CELL COORDINATES:(955,532)-(1335,614)<br>COLUMN COORDINATES:(1032,532)-(1335, 955) |
| ARTICLE CODE | .. |
| ORDER NUMBER | .. |

FIG. 12

| JOB ID | USER ID | LEDGER SHEET IMAGE FILE PATH | RECOGNITION RESULT FILE PATH | STATUS |
|---|---|---|---|---|
| J1 | A123 | XXX | YYYY | UNPROCESSED |
| J2 | B111 | XXY | ... | ... |
| ... | ... | ... | ... | ... |

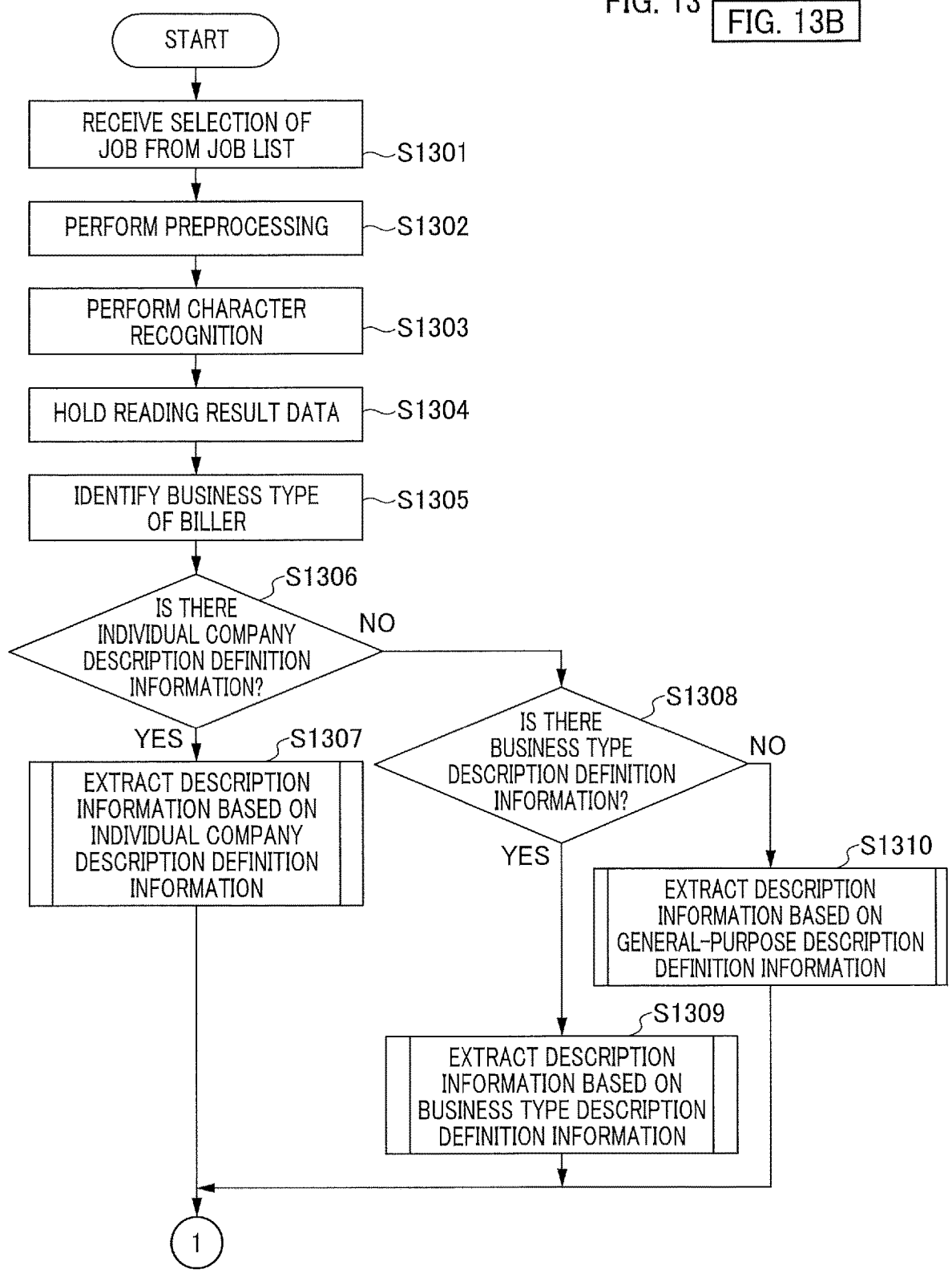

FIG. 16

INVOICE

TO: AC CORPORATION

DATE OF INVOICE: JULY 20, 2018

FROM: ABC TRADING COMPANY — 161a

161b

161

| ARTICLE CODE | NAME OF ARTICLE | QUAN-TITY | UNIT PRICE | ARTICLE PRICE | NOTES | ORDER NUMBER |
|---|---|---|---|---|---|---|
| 0012 | A | 30 | 15,000 | 450,000 | | 2018071800102 |
| 0033 | B | 50 | 11,600 | 580,000 | | 2018071800102 |
| | | | | SUBTOTAL | | 1,030,000 |

FIG. 17A

| ID | X COOR-DINATE | Y COOR-DINATE | WIDTH OF CHARACTER | HEIGHT OF CHARACTER | DEGREE OF CERTAINTY | CHAR-ACTER |
|---|---|---|---|---|---|---|
| 73 | 385 | 552 | 77 | 45 | 99 | 品 |
| 74 | 363 | 552 | 76 | 42 | 99 | 名 |
| ...... |
| 76 | 958 | 553 | 19 | 32 | 98 | 商 |
| 77 | 990 | 552 | 32 | 28 | 99 | 品 |
| 78 | 1018 | 549 | 28 | 27 | 99 | 金 |
| 79 | 1040 | 551 | 22 | 28 | 99 | 額 |
| ...... |
| 98 | 385 | 606 | 77 | 37 | 98 | A |
| ...... |
| 99 | 958 | 606 | 14 | 37 | 98 | 3 |
| 100 | 972 | 613 | 15 | 23 | 99 | 0 |
| 101 | 987 | 614 | 15 | 20 | 99 | 0 |
| 102 | 1002 | 613 | 11 | 26 | 99 | , |
| 103 | 1013 | 615 | 15 | 27 | 99 | 0 |
| 104 | 1028 | 607 | 13 | 35 | 99 | 0 |
| 105 | 1042 | 609 | 14 | 32 | 99 | 0 |
| ...... |

~171

| ID | X COOR-DINATE | Y COOR-DINATE | WIDTH OF KEYWORD | HEIGHT OF KEYWORD | KEYWORD |
|---|---|---|---|---|---|
| 17 | 385 | 552 | 153 | 45 | NAME OF ARTICLE |
| ...... |
| 22 | 985 | 553 | 310 | 32 | ARTICLE PRICE |
| ...... |
| 36 | 358 | 606 | 77 | 37 | A |
| ...... |
| 41 | 958 | 606 | 84 | 15 | 300,000 |
| ...... |

~172

| CELL ID | X COOR-DINATE | Y COOR-DINATE | WIDTH OF CELL | HEIGHT OF CELL |
|---|---|---|---|---|
| 2 | 355 | 532 | 221 | 82 |
| ...... |
| 7 | 955 | 532 | 380 | 82 |
| ...... |
| 9 | 355 | 619 | 221 | 80 |
| ...... |

| COLUMN ID | DESCRIPTION ITEM NAME (COLUMN NAME) | COLUMN COORDINATES | ROW ID | ITEM VALUE (CONTENTS OF CELL) | SPECIFI-CATION OF DESCRIPTION ITEM |
|---|---|---|---|---|---|
| 1 | ORDER NUMBER | (200,532)–(355,955) | 1 | 20180718001002 | ORDER NUMBER |
|   |   |   | 2 | 20180718001002 |   |
| 2 | NAME OF ARTICLE | (355,532)–(576,955) | 1 | A | ARTICLE NAME |
|   |   |   | 2 | B |   |
| 7 | ARTICLE PRICE | (1032,532)–(1335,955) | 1 | 450,000 | PRICE |
|   |   |   | 2 | 580,000 |   |

‹ CHECK/CHANGE LEDGER SHEET — 501C

Page ◀ 1/1 ▶ ⤓  Zoom ⊕ ⊖ ⛶

502A

INVOICE
TO: AC CORPORATION
DESCRIPTION:

| | | |
|---|---|---|
| CUSTOMER NO. | AT-4567-89 | DATE OF INVOICE: JULY 20, 2018 |
| INVOICE NO. | A123-03 | FROM: ABC TRADING COMPANY |
| CUTOFF DATE | JUNE 30, 2018 | PLEASE PROCEED WITH PAYMENT AS FOLLOWS: |
| INVOICE TOTAL | ¥1,133,000 | PAYMENT DUE DATE : AUGUST 20, 2018 |
| CONSUMPTION TAX | ¥103,000 | |

SHINJUKU BANK  BRANCH: TOKYO CENTRAL  ACCOUNT TYPE: CHECKING
ACCOUNT NUMBER: 9638527
NAME ON ACCOUNT: ABC TRADING COMPANY

| ARTICLE CODE | ARTICLE NAME | QUAN-TITY | UNIT PRICE | ARTICLE PRICE | NOTES |
|---|---|---|---|---|---|
| 0012 | A | 30 | 15,000 | 450,000 | 2018071800102 |
| 0033 | B | 50 | 11,600 | 580,000 | 2018071800102 |
| | | | | SUB TOTAL | 1,030,000 |

504A

---

LEDGER SHEET OCR LEARNING — 520, 523

WITH A CHANGE IN READING POSITION, NEW INFORMATION FOR LEARNING SETTINGS WILL BE ADDED. PLEASE ENTER THE CONTENTS OF THE LEDGER SHEET TO IMPROVE OCR ACCURACY.

BILLER                    ABC TRADING COMPANY  } 524
BILLER PHONE NUMBER       [        ]
BILLER ACCOUNT NUMBER     [        ]

ITEM TO BE ADDED    + PHONE NUMBER    + ACCOUNT NUMBER

※PLEASE TYPE THE PHONE NUMBER AND ACCOUNT NUMBER OF THE BILLER AS WRITTEN ON THE LEDGER SHEET.
(e.g., FOR PHONE NUMBER (03)-1234-5678, PLEASE TYPE THE PARENTHESES AND HYPHEN TOO.)

[ CANCEL ]   [ CONFIRM ] — 525

[ SAVE AS DRAFT ] — 508    [ CONFIRM ] — 509

FIG. 25

| | | |
|---|---|---|
| < CHECK/CHANGE LEDGER SHEET 502C | | 505 UNPROCESSED 503B |

501D

Invoice panel (502C / 504B):
- INVOICE
- TO: AC CORPORATION
- DESCRIPTION:
- CUSTOMER NO. A1-4567-89
- INVOICE NO. A123-03
- CUTOFF DATE JUNE 30, 2018
- INVOICE TOTAL ¥1,133,000
- CONSUMPTION TAX ¥103,000
- DATE OF INVOICE: JULY 20, 2018
- FROM: ABC TRADING COMPANY
- PLEASE PROCEED WITH PAYMENT AS FOLLOWS:
- PAYMENT DUE DATE: AUGUST 20, 2018
- SHINJUKU BANK  BRANCH: TOKYO CENTRAL  ACCOUNT TYPE: CHECKING
- ACCOUNT NUMBER: 9638527
- NAME ON ACCOUNT: ABC TRADING COMPANY

| ARTICLE CODE | ARTICLE NAME | QUANTITY | ARTICLE PRICE | NOTES | ORDER NUMBER |
|---|---|---|---|---|---|
| 0012 | A | 30 | 450,000 | | 201807180O102 |
| 0033 | B | 50 | 580,000 | | 201807180O102 |
| | | | SUB TOTAL | | 1,030,000 |

INVOICE INFORMATION
- INVOICE NUMBER: A123-03    DATE OF INVOICE: JULY 20, 2018
- BILLER: ABC TRADING COMPANY
- BILLING AMOUNT (TAX INCLUDED): 1,133,000    BILLING AMOUNT (TAX EXCLUDED): 1,030,000
- DESCRIPTION INFORMATION  [EXTRACT DESCRIPTION] 510   TOTAL SUM 1,133,000

506 / 514 / 507B

| | | | |
|---|---|---|---|
| A | 0012 | 30 | 450,000 UNIT PRICE |
| B | 0033 | 50 | 580,000 UNIT PRICE |

+ ADD DESCRIPTION

JOURNAL    2018/02/28

| 03,000 | **** 1,133,000 | | **** 1,133,000 |

+ ADD JOURNAL

[SAVE AS DRAFT] 508    [CONFIRM] 509

| ARTICLE CODE | NAME OF ARTICLE / ARTICLE NAME | QUANTITY | UNIT PRICE | ARTICLE PRICE | NOTES | ORDER NUMBER |
|---|---|---|---|---|---|---|
| 0012 | A | 30 | 15,000 | 450,000 | | 2018071800102 |
| 0033 | B | 50 | 11,600 | 580,000 | | 2018071800102 |
| | | | | | SUBTOTAL | 1,030,000 |

| ARTICLE CODE | NAME OF ARTICLE / ARTICLE NAME | QUANTITY | UNIT PRICE | ARTICLE PRICE | NOTES | ORDER NUMBER |
|---|---|---|---|---|---|---|
| 0012 | A | 30 | 15,000 | 450,000 | | 2018071800102 |
| 0033 | B | 50 | 11,600 | 580,000 | | 2018071800102 |
| | | | | | SUBTOTAL | 1,030,000 |

575 / 576 / 582a / 550

INFORMATION PROCESSING SYSTEM, INFORMATION PROCESSING METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2020-038959 filed on Mar. 6, 2020 in the Japan Patent Office, the entire disclosure of which is hereby incorporated by reference herein.

BACKGROUND

Technical Field

The present invention relates to an information processing system, an information processing method, and a non-transitory recording medium.

Description of the Related Art

There is a ledger sheet recognition technique of previously specifying a combination of a plurality of related item values in a ledger sheet listing combinations of a plurality of item names and a plurality of item values, to thereby extract from the image of the ledger sheet the item value corresponding to a certain item name, even if there is no description of the item name in the image of the ledger sheet.

There is also a technique that, when the ledger sheet is not properly recognized, allows a user to directly specify the area from which the item value is to be extracted.

The image of the ledger sheet may include an image expressed in table format (hereinafter referred to as the tabular image), such as the image of a description section of the ledger sheet. According to existing ledger sheet recognition techniques, however, extracting the item value for each of one or more extraction target items from the tabular image is not taken into consideration. Further, to set in the tabular image an extraction area for extracting the item value for any of one or more extraction target items, an operation of specifying the area of the extraction target item is likely to be complicated.

SUMMARY

In one embodiment of this invention, there is provided an improved information processing system that includes, for example, circuitry that causes a terminal apparatus to display a setting screen for setting an extraction area for extracting, from a tabular image, an item value for each of one or more extraction target items. The setting screen displays, on the tabular image, an extraction guide representing the extraction area according to each of the one or more extraction target items. The circuitry further receives an operation of setting a position of the extraction guide on the setting screen.

In one embodiment of this invention, there is provided an improved information processing method that includes, for example, displaying, on a display, a setting screen for setting an extraction area for extracting, from a tabular image, an item value for each of one or more extraction target items. The setting screen displays, on the tabular image, an extraction guide representing the extraction area according to each of the one or more extraction target items. The information processing method further includes, for example, receiving an operation of setting a position of the extraction guide on the setting screen.

In one embodiment of this invention, there is provided a non-transitory recording medium storing a plurality of instructions which, when executed by one or more processors, cause the processors to perform the above-described information processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is a diagram illustrating an example of general-purpose description definition information of the embodiment;

FIG. 7 is a diagram illustrating an example of business type description definition information of the embodiment;

FIG. 8 is a diagram illustrating an example of individual company description definition information of the embodiment;

FIG. 12 is a diagram illustrating an example of a job list of the embodiment;

FIGS. 13A and 13B are a flowchart illustrating an example of the process of a ledger sheet recognizing unit in the server of the embodiment;

FIG. 16 is a diagram illustrating an example of extraction of description information of the embodiment;

FIGS. 17A and 17B are diagrams illustrating another example of the extraction of the description information of the embodiment;

FIG. 20 to FIGS. 28A and 28B are diagrams illustrating display examples of a recognition result check screen of the embodiment.

Figure 1:
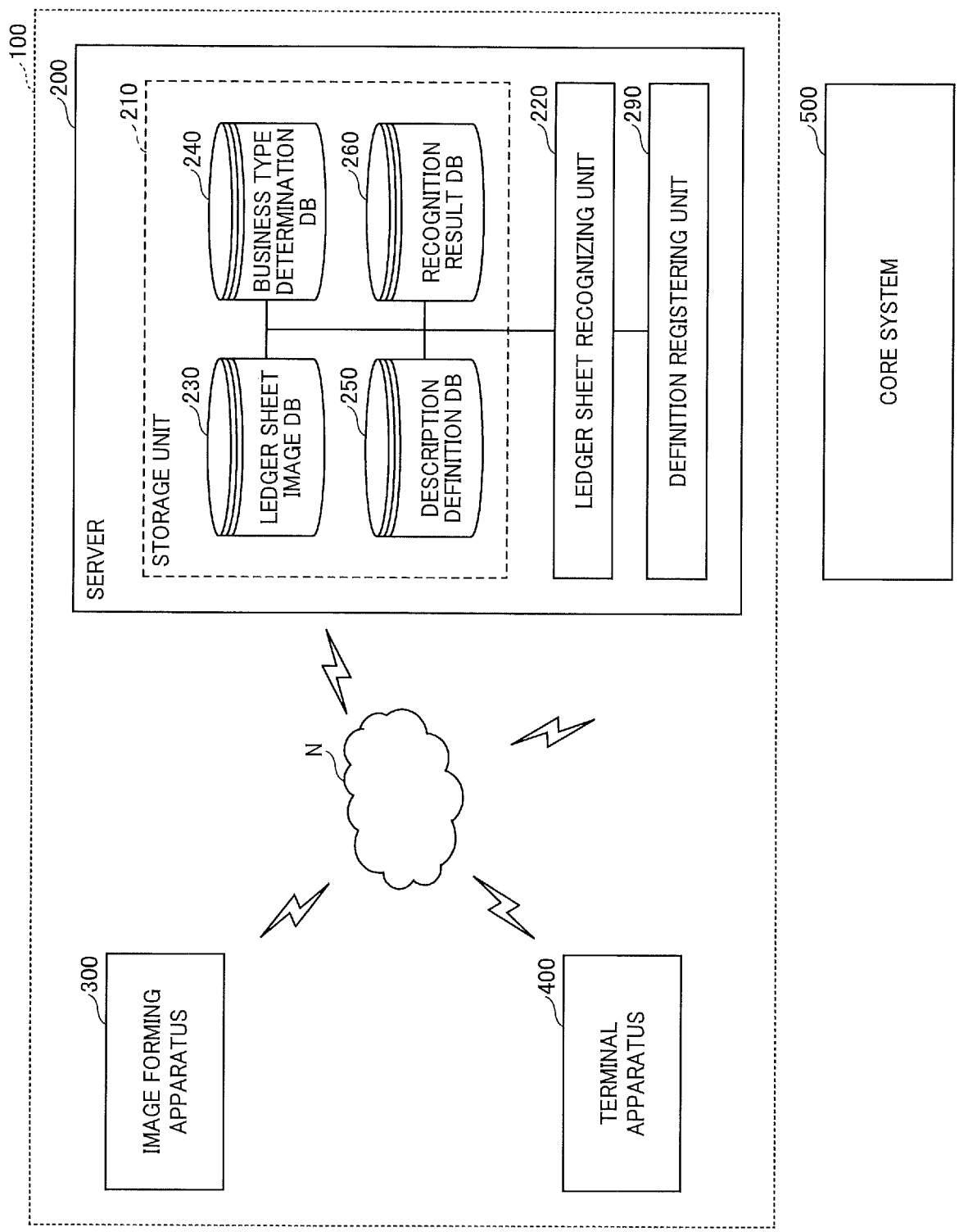
FIG. 1 is a diagram illustrating an example of the system configuration of a ledger sheet recognition system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An embodiment of the present invention will be described below with reference to the drawings.

FIG. 1 is a diagram illustrating an example of the system configuration of a ledger sheet recognition system of the embodiment.

A ledger sheet recognition system 100 of the embodiment includes a server 200, an image forming apparatus 300, and a terminal apparatus 400, which are connected to each other via a network N. The ledger sheet recognition system 100 of the embodiment is an example of an information processing system.

The terminal apparatus 400 of the embodiment is connected to a core system 500 via the network N, for example. The core system 500 is a system that performs a particular process with a result of recognizing a ledger sheet in the ledger sheet recognition system 100 of the embodiment, for example. Specifically, the core system 500 may be an accounting system or a quotation preparation system, for example.

In the ledger sheet recognition system 100 of the embodiment, the server 200 extracts, from image data representing the image of a ledger sheet read by a scanner function of the image forming apparatus 300, items and the values of the items included in the ledger sheet, and generates text data associating the items with the values of the items.

In the following description, the image of the ledger sheet read by the scanner function of the image forming apparatus 300 will be described as the ledger sheet image, and the image data representing the ledger sheet image will be described as the ledger sheet image data.

Further, in the following description, extracting an item and the value of the item from the ledger sheet image and converting the item and the value of the item into text data associating the item with the value of the item will be described as the ledger sheet recognition.

The server 200 of the embodiment includes a storage unit 210, a ledger sheet recognizing unit 220, and a definition registering unit 290. The storage unit 210 includes a ledger sheet image database (DB) 230, a business type determination DB 240, a description definition DB 250, and a recognition result DB 260.

The ledger sheet image DB 230 stores the ledger sheet image data. The business type determination DB 240 stores information that is referred to to determine the business type of the issuer of the ledger sheet. The description definition DB 250 stores description definition information that is referred to in the ledger sheet recognition performed by the ledger sheet recognizing unit 220. The recognition result DB 260 stores recognition result data, which is information representing the result of the ledger sheet recognition performed by the ledger sheet recognizing unit 220.

The ledger sheet recognizing unit 220 of the embodiment acquires the ledger sheet image data stored in the ledger sheet image DB 230. With reference to the business type determination DB 240, the ledger sheet recognizing unit 220 determines the business type of the issuer of the ledger sheet, and identifies the description definition information to be referred to. Further, the ledger sheet recognizing unit 220 performs the ledger sheet recognition with the description definition information identified in the description definition DB 250, and stores the result of the ledger sheet recognition in the recognition result DB 260. The description definition information includes item names of description items included in the ledger sheet and information representing the description positions of the item names.

In the ledger sheet recognition, the ledger sheet recognizing unit 220 of the embodiment refers to individual company description definition information, business type description definition information, and general-purpose description definition information stored in the description definition DB 250.

In the embodiment, the general-purpose description definition information refers to information defining words corresponding to description item names in a typical ledger sheet. The business type description definition information refers to information defining words corresponding to description item names in a ledger sheet for a specific business type. The individual company description definition information refers to information defining words corresponding to description item names in a ledger sheet specific to a user of the ledger sheet recognition system 100 and information extracted from the ledger sheet image. Details of the business type determination DB 240 and the description definition DB 250 will be described later.

In the embodiment, the three types of description definition information are thus used in the ledger sheet recognition, thereby enabling the recognition of a description section of the ledger sheet as well as the recognition of a general-purpose ledger sheet, and thus improving the accuracy of the ledger sheet recognition.

A description will be given of the description section of the ledger sheet. The description section of the ledger sheet refers to a section including a data aggregation result, for example. In the description section, the same format of data is repeatedly printed vertically for each description item. The description item refers to an item of data aggregated in the description section. Typical description items include article name, quantity, unit price, and price, for example. Specific examples of the description section will be described later.

In the ledger sheet recognition system 100 of the embodiment, the image forming apparatus 300 is a multifunction peripheral (MFP) with a scanner function. The image forming apparatus 300 is installed with applications (i.e., application programs) for implementing functions such as the scanner function, a copier function, and a facsimile (FAX) function. When the application corresponding to a desired one of the functions is selected, the desired function is implemented.

The terminal apparatus 400 of the embodiment is used by the user of the ledger sheet recognition system 100. The terminal apparatus 400 may display the result of the ledger sheet recognition performed by the server 200.

In the embodiment, the user is a company or firm that issues the ledger sheet, for example. More specifically, the user is a business establishment, company, firm, or organization, for example, which has a contract to use a service provided by the ledger sheet recognition system 100.

In the configuration example of FIG. 1, the server 200 includes four databases in the storage unit 210. The databases, however, are not limited to this example. The databases may be partially disposed outside the server 200, or all of the databases may be included in an external apparatus.

Further, in the example of FIG. 1, the ledger sheet recognizing unit 220 is implemented by the server 200. However, the ledger sheet recognizing unit 220 is not necessarily implemented by the server 200, and may be implemented by a plurality of information processing apparatuses.

Further, in the example of FIG. 1, the ledger sheet recognition system 100 includes one image forming apparatus 300 and one terminal apparatus 400. The ledger sheet recognition system 100, however, may include a desired number of image forming apparatuses 300 and a desired number of terminal apparatuses 400.

A hardware configuration of the server 200 of the embodiment will be described with reference to FIG. 2.

Figure 2:
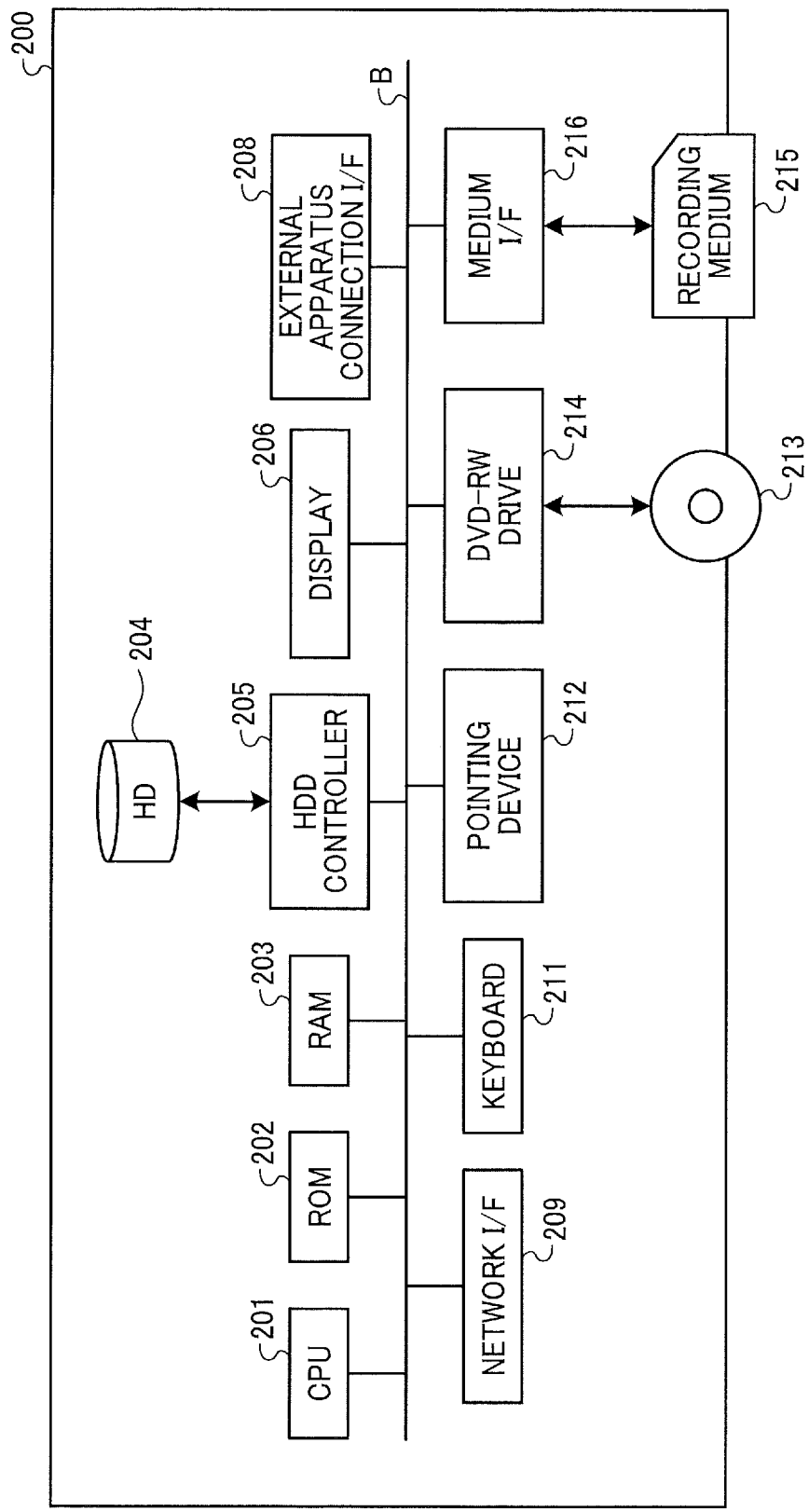
FIG. 2 is a diagram illustrating an example of the hardware configuration of a server included in the ledger sheet recognition system of the embodiment.

FIG. 2 is a diagram illustrating an example of the hardware configuration of the server 200. The server 200 of the embodiment is implemented by a computer. As illustrated in FIG. 2, the server 200 includes a central processing unit (CPU) 201, a read only memory (ROM) 202, a random access memory (RAM) 203, a hard disk (HD) 204, a hard disk drive (HDD) controller 205, a display 206, an external apparatus connection interface (I/F) 208, a network I/F 209, a data bus B, a keyboard 211, a pointing device 212, a digital versatile disk-rewritable (DVD-RW) drive 214, and a medium I/F 216.

The CPU 201 controls the overall operation of the server 200. The ROM 202 stores a program used to drive the CPU 201, such as an initial program loader (IPL). The RAM 203 is used as a work area for the CPU 201. The HD 204 stores various data of programs, for example. The HDD controller 205 controls writing and reading of various data to and from the HD 204 under the control of the CPU 201. The display 206 is a display device that displays various information such as a cursor, menus, windows, text, and images.

The external apparatus connection I/F 208 is an interface for connecting the server 200 to various external apparatuses. The external apparatuses in this case include a universal serial bus (USB) memory and a printer, for example. The network I/F 209 is an interface for performing data communication via a communication network such as the network N. The data bus B includes an address bus and a data bus for electrically connecting the CPU 201 and the other components in FIG. 2 to each other.

The keyboard 211 is an input device including a plurality of keys for inputting text, numerical values, and various instructions, for example. The pointing device 212 is an input device used to select and execute various instructions, select a processing target, and move the cursor, for example.

The DVD-RW drive 214 controls writing and reading of various data to and from a DVD-RW 213 as an example of a removable recording medium. The removable recording medium is not limited to the DVD-RW, and may be a DVD-recordable (DVD-R), for example. The medium I/F 216 controls writing (i.e., storage) and reading of data to and from a recording medium 215 such as a flash memory.

The server 200 of the embodiment may be a smartphone, a tablet terminal, a personal digital assistant (PDA), or a wearable personal computer (PC), for example.

The terminal apparatus 400 of the embodiment is a computer including an arithmetic processing device and a storage device, and may be a tablet terminal apparatus or a smartphone, for example.

Figure 3:
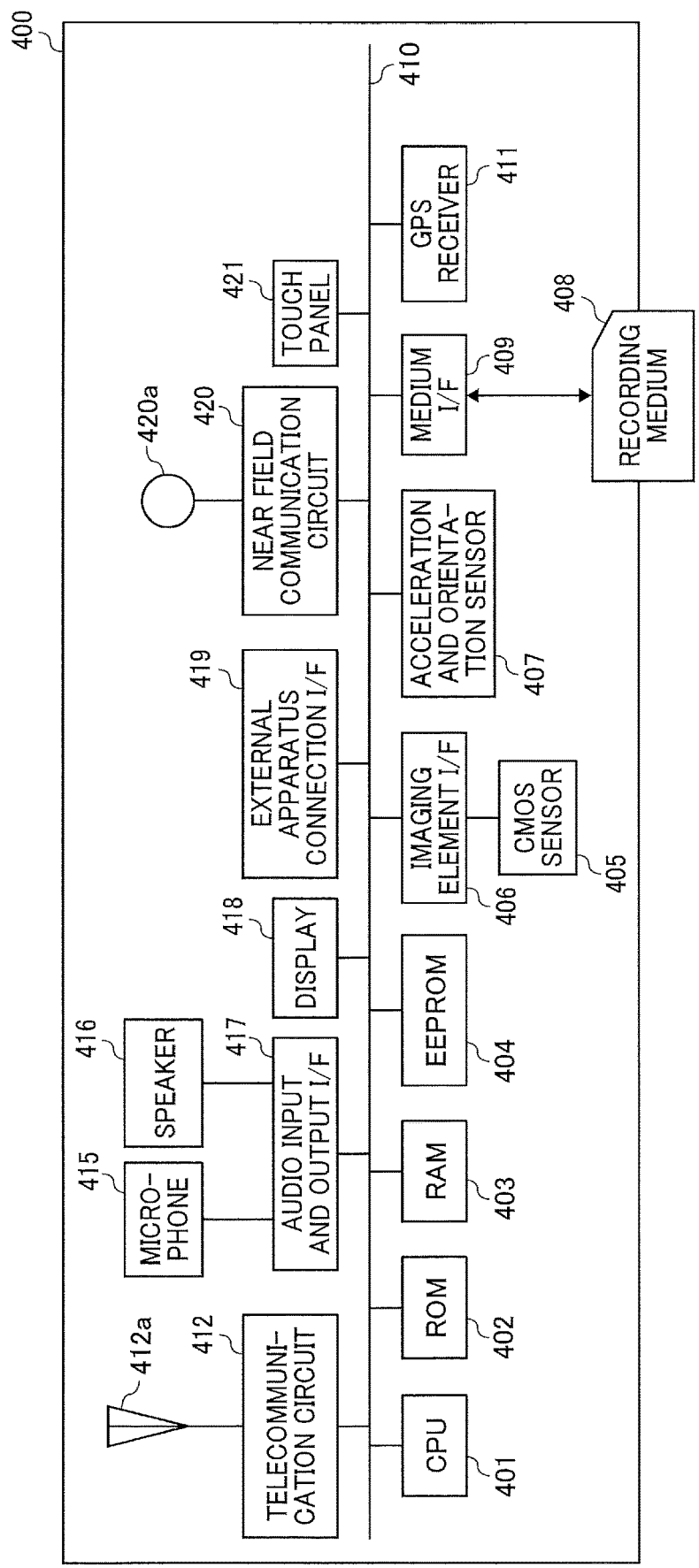
FIG. 3 is a diagram illustrating an example of the hardware configuration of a terminal apparatus included in the ledger sheet recognition system of the embodiment.

FIG. 3 is a diagram illustrating an example of the hardware configuration of the terminal apparatus 400. The terminal apparatus 400 of the embodiment includes a CPU 401, a ROM 402, a RAM 403, an electrically erasable programmable read only memory (EEPROM) 404, a complementary metal oxide semiconductor (CMOS) sensor 405, an imaging element I/F 406, an acceleration and orientation sensor 407, a medium I/F 409, and a global positioning system (GPS) receiver 411.

The CPU 401 is an arithmetic processing device that controls the overall operation of the terminal apparatus 400. The ROM 402 stores programs for the CPU 401 and a program used to drive the CPU 401 such as an IPL. The RAM 403 is used as a work area for the CPU 401. The EEPROM 404 writes or reads various data of a program for the terminal apparatus 400, for example, under the control of the CPU 401. The ROM 402, the RAM 403, and the EEPROM 404 are examples of storage devices of the terminal apparatus 400.

The CMOS sensor 405 is a built-in imaging device that captures the image of a subject (mainly the image of a user) under the control of the CPU 401 to obtain image data. The CMOS sensor 405 may be replaced by another imaging device such as a charge coupled device (CCD) sensor.

The imaging element I/F 406 is a circuit that controls the driving of the CMOS sensor 405. The acceleration and orientation sensor 407 includes various types of sensors such as an electromagnetic compass that detects geomagnetism, a gyrocompass, and an acceleration sensor. The medium I/F 409 controls data writing (i.e., storage) and reading to and from a recording medium 408 such as a flash memory. The GPS receiver 411 receives a GPS signal from a GPS satellite.

The terminal apparatus 400 further includes a telecommunication circuit 412, an antenna 412a for the telecommunication circuit 412, a microphone 415, a speaker 416, an audio input and output I/F 417, a display 418, an external apparatus connection I/F 419, a near field communication circuit 420, an antenna 420a for the near field communication circuit 420, a touch panel 421, and a data bus 410.

The telecommunication circuit 412 is a circuit that communicates with another apparatus via a communication network. The microphone 415 is a built-in circuit that converts sound into an electrical signal. The speaker 416 is a built-in circuit that convers an electrical signal into physical vibration to produce the sound of music or voice, for example. The audio input and output I/F 417 is a circuit that processes the input of an audio signal from the microphone 415 and the output of an audio signal to the speaker 416 under the control of the CPU 401.

The display 418 is a liquid crystal or organic electroluminescence (EL) display, for example, which displays the image of the subject and various icons, for example. The external apparatus connection I/F 419 is an interface for connecting the terminal apparatus 400 to various external apparatuses. The near field communication circuit 420 is a communication circuit conforming to a standard such as near field communication (NFC) or Bluetooth (registered trademark). The touch panel 421 is an input device for the user to operate the terminal apparatus 400 by pressing the display 418. The display 418 is an example of a display device included in the terminal apparatus 400. The data bus 410 includes an address bus and a data bus for electrically connecting the CPU 401 and the other components in FIG. 3 to each other.

A description will be given of the business type determination DB 240 and the description definition DB 250 in the server 200 of the embodiment.

Figures 4, 5:
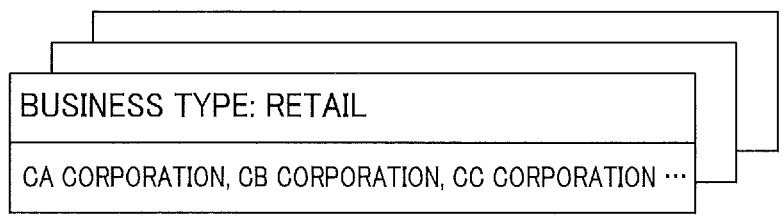
FIG. 4 is a diagram illustrating an example of a business type determination database in the server of the embodiment.
FIG. 5 is a diagram illustrating types of description definition information stored in a description definition database in the server of the embodiment.

FIG. 4 is a diagram illustrating an example of the business type determination DB 240. The business type determination DB 240 of the embodiment is provided for each of various business types.

In the business type determination DB 240, the business type and the issuer of the ledger sheet are associated with each other. In the example of FIG. 4, a business type "retail" is associated with CA Corporation, CB Corporation, and CC Corporation. It is therefore understood that CA Corporation, CB Corporation, and CC Corporation are retailing businesses.

The description definition DB 250 of the embodiment will be described with reference to FIGS. 5 to 8.

FIG. 5 is a diagram illustrating types of the description definition information included in the description definition DB 250. The description definition DB 250 of the embodiment includes individual company description definition information 251, business type description definition information 252, and general-purpose description definition information 253. In the embodiment, the individual company description definition information 251 is first description definition information, and the business type description definition information 252 is second description definition information. Further, the general-purpose description definition information 253 is third description definition information.

The individual company description definition information 251 of the embodiment is user-specific description definition information defining the description item names included in a ledger sheet personally designed by the user and the description positions of the description item names. The individual company description definition information 251 is of the highest priority among the above-described three types of description definition information, and includes the definitions of the highest importance.

The business type description definition information 252 of the embodiment is description definition information defining the description item names included in a ledger sheet typically used in a specific industry and the description positions of the description item names. The business type description definition information 252 is of the second highest priority among the three types of description definition information.

The general-purpose description definition information 253 of the embodiment is description definition information defining the description item names included in a highly versatile ledger sheet used by multiple users and the description positions of the description item names. The general-purpose description definition information 253 is of the lowest priority among the three types of description definition information.

The ledger sheet recognizing unit 220 of the embodiment recognizes the ledger sheet image data with reference to the three types of description definition information. In the embodiment, therefore, even if the ledger sheet image data corresponding to the ledger sheet image data includes a description item name not defined in the individual company description definition information 251, for example, the ledger sheet image data is recognizable if the description item name is defined in the business type description definition information 252 or the general-purpose description definition information 253.

The following description will be given of an invoice as an example of the ledger sheet. The ledger sheet may be any type of ledger sheet including the description section. Specifically, the ledger sheet may be a statement of delivery, a quotation, or a purchase slip, for example.

If the ledger sheet is the statement of delivery, the issuer of the ledger sheet is the party that issues the statement of delivery. If the ledger sheet is the purchase slip, the issuer of the ledger sheet is the party that issues the purchase slip.

FIG. 6 is a diagram illustrating an example of the general-purpose description definition information 253. The general-purpose description definition information 253 defines the description item names used in the description section of a typical invoice. The general-purpose description definition information 253 includes information items "description item name" and "keyword," which are associated with each other.

The value of the information item "description item name" represents the name of a description item used in the description section of the invoice. The value of the information item "keyword" represents a keyword (i.e., word) regarded as synonymous with the corresponding description item name in the description section.

That is, the general-purpose description definition information 253 is information defining the description items used in the typical ledger sheet and the keywords extracted from the ledger sheet as the description items.

The example of FIG. 6 indicates that a description item name "article name" is treated as a synonym of keywords such as "article" and "product," and that a description item name "price" is treated as a synonym of keywords such as "total price" and "total sum."

The example of FIG. 6 further indicates that a description item name "order number" is treated as a synonym of keywords such as "order No." and "slip number," and that a description item name "article code" is treated as a synonym of keywords such as "article No." and "article number."

FIG. 7 is a diagram illustrating an example of the business type description definition information 252. The business type description definition information 252 is information set for each business type to define the description item names used in the description section of a typical invoice used in the industry represented by the business type.

The business type description definition information 252 includes information identifying the business type and the information items "description item name" and "keyword," which are associated with each other. The example of FIG. 7 indicates that the business type in this case is retail.

The value of the information item "description item name" represents the name of a description item used in the description section of the typical invoice. The value of the information item "keyword" represents a keyword (i.e., word) corresponding to a typical description item name in an invoice billed by a retail business.

That is, the business type description definition information 252 is information defining the business type, the description items used in the ledger sheet, and the keywords extracted from the ledger sheet as the description items.

The example of FIG. 7 indicates that the description item name "article name" in the typical ledger sheet may be replaced by a keyword such as "name of article" or "product name" in the description section of the invoice issued by a retail business.

FIG. 8 is a diagram illustrating an example of the individual company description definition information 251. The individual company description definition information 251 of the embodiment is registered for each user. The user in this case is the issuer (i.e., biller) of the invoice.

The individual company description definition information 251 includes information identifying the biller, the information item "description item name," and an information item "extracted information," which are associated with each other.

The information identifying the biller includes, for example, the name, phone number, and account number of the biller. In the example of FIG. 8, the name, phone number, and account number of the biller are thus included in the information identifying the biller. The information identifying biller, however, may be one of the name, phone number, and account number of the biller.

The value of the information item "description item name" represents the name of a description item used in the description section of the typical invoice. That is, the description item name in the individual company description definition information 251 represents the description item used in the ledger sheet.

The value of the information item "extracted information" includes a keyword extracted, from the invoice issued by the biller, as the keyword (i.e., word) corresponding to a typical description item and information representing the description position of the keyword in the ledger sheet image representing the invoice.

That is, the extracted information in the individual company description definition information 251 includes the keywords extracted from the ledger sheet as the description items and the information representing the positions of the keywords in the ledger sheet. The individual company description definition information 251 is therefore information defining the description items used in the ledger sheet, the keywords extracted from the ledger sheet as the description items, and the information representing the positions of the keywords in the ledger sheet.

The example of FIG. 8 indicates that the description item name "article name" in the typical ledger sheet may be replaced by a keyword such as "name of article" in the description section of the invoice billed by CA Corporation.

The example of FIG. 8 further indicates that keyword coordinates representing the coordinates of the keyword "name of article," cell coordinates representing the coordinates of the cell in which the keyword "name of article" is described, and column coordinates representing the coordinates of the column in which the keyword "name of article" is described are extracted as the information representing the position of the keyword "name of article" in the ledger sheet image representing the invoice billed by CA Corporation.

It suffices if the values of at least one of the keyword coordinates, the cell coordinates, and the column coordinates are acquired from the ledger sheet image of the invoice as the information representing the description position of the keyword.

Specifically, the values of the keyword coordinates may be the values of the coordinates of two points on a diagonal of a rectangle circumscribed about a character string representing the keyword. The width and height of the rectangle circumscribed about the character string of the keyword are derived from the coordinates of the two points.

Functions of the server 200 of the embodiment will be described with reference to FIG. 9.

Figure 9:
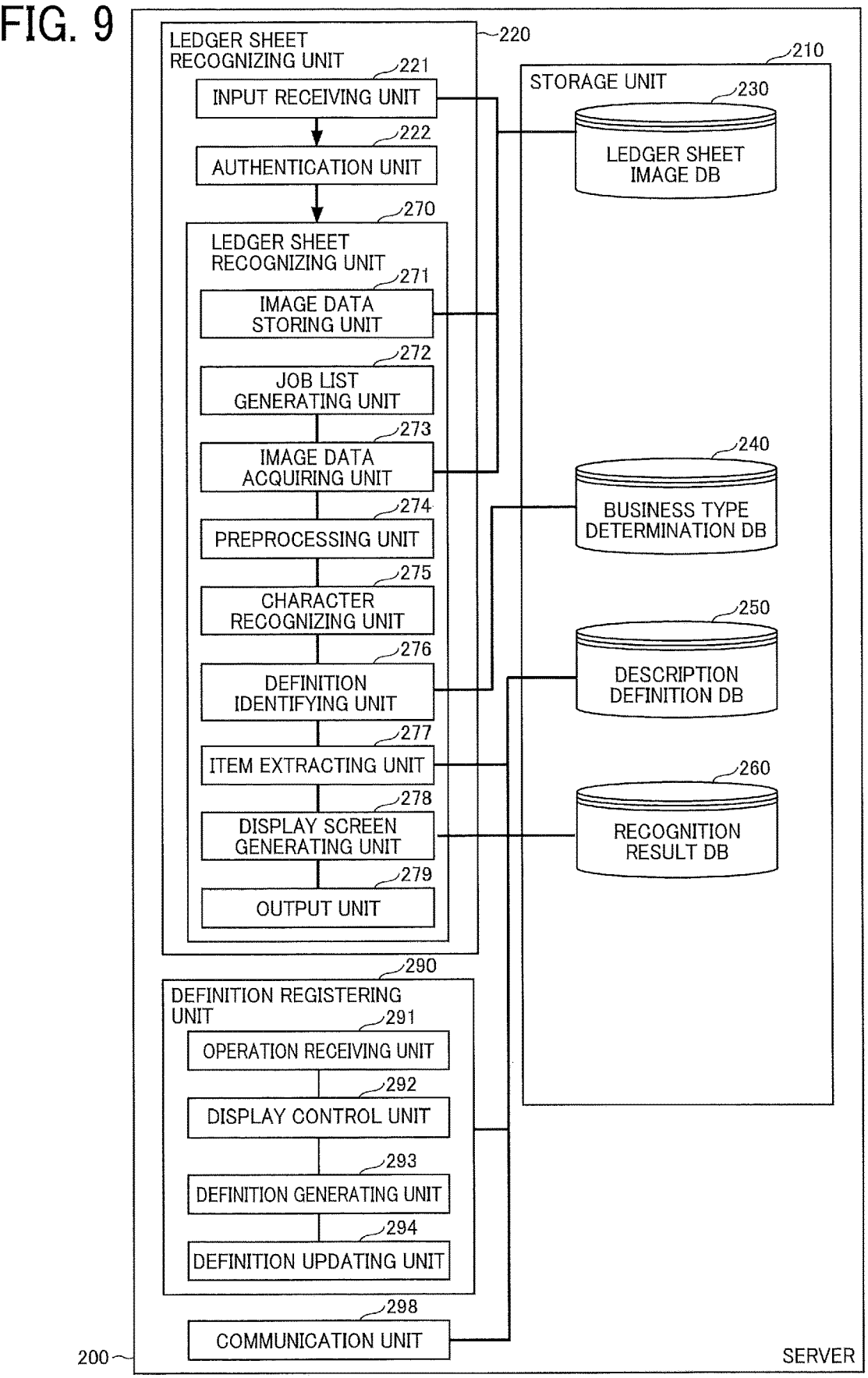
FIG. 9 is a diagram illustrating functions of the server of the embodiment.

FIG. 9 is a diagram illustrating functions of the server 200. In the server 200 of the embodiment, the CPU 201 reads and executes an information processing program stored in a memory such as the ROM 202 or the RAM 203, for example, to thereby implement the functions of the units described below.

The server 200 of the embodiment includes the ledger sheet recognizing unit 220, the definition registering unit 290, and a communication unit 298. The ledger sheet recognizing unit 220 includes an input receiving unit 221, an authentication unit 222, and a ledger sheet recognizing unit 270.

The input receiving unit 221 receives a variety of inputs to the server 200. Specifically, the input receiving unit 221 receives input of authentication information for logging in to the ledger sheet recognition system 100. The authentication information includes a user identifier (ID) and a password, for example. The input receiving unit 221 further receives input of the ledger sheet image data transmitted from the image forming apparatus 300, for example. The input receiving unit 221 may receive the input to the server 200 via the communication unit 298, or may directly receive the input to the server 200.

The authentication unit 222 performs authentication based on the authentication information input to the input receiving unit 221. For example, the authentication unit 222 may transmit the input authentication information to an authentication server disposed outside the server 200, and may acquire a result of authentication performed by the authentication server. If the user is authenticated, the authentication unit 222 may transmit the ledger sheet image data received by the input receiving unit 221 to the ledger sheet recognizing unit 270.

The ledger sheet recognizing unit 270 of the embodiment includes an image data storing unit 271, a job list generating unit 272, an image data acquiring unit 273, a preprocessing unit 274, a character recognizing unit 275, a definition identifying unit 276, an item extracting unit 277, a display screen generating unit 278, and an output unit 279.

When the input receiving unit 221 receives the ledger sheet image data from the image forming apparatus 300 via the communication unit 298, the image data storing unit 271 stores the ledger sheet image data in the ledger sheet image DB 230.

When the input receiving unit 221 receives the input of the ledger sheet image data from the image forming apparatus 300 via the communication unit 298, the job list generating unit 272 registers a job in a job list, and manages the job list. Details of the job list will be described later.

The image data acquiring unit 273 acquires the ledger sheet image data stored in the ledger sheet image DB 230.

The preprocessing unit 274 performs preprocessing for the ledger sheet recognition on the ledger sheet image data acquired by the image data acquiring unit 273.

The character recognizing unit 275 extracts, from the ledger sheet image data, character strings and information representing the disposition positions of the character strings, and holds the extracted character strings and information as reading result data. Details of the reading result data will be described later.

The definition identifying unit 276 is an acquisition unit that identifies, based on the character strings included in the reading result data, the description definition information that is referred to in the ledger sheet recognition, and acquires the identified description definition information from the description definition DB 250.

The item extracting unit 277 generates recognition result data based on the reading result data, and stores the generated recognition result data in the recognition result DB 260. In the recognition result data, the items and the values of the items extracted from the ledger sheet data are associated with each other.

In this process, with reference to the description definition information identified by the definition identifying unit 276, the item extracting unit 277 of the embodiment extracts the description item names and the values of the description items described in the description section of the ledger sheet such that the description item names and the values of the description items are associated with each other.

In the following description, information associating the description item names and the values of the description items in the description section of the ledger sheet with each other may be described as the description information. The description information of the embodiment is included in the recognition result data. That is, the description information forms a part of the recognition result data.

Further, the recognition result data of the embodiment includes issuer information representing the issuer of the ledger sheet, which is described in the ledger sheet. That is, the recognition result data includes information represented by a character string described in the ledger sheet.

The display screen generating unit 278 generates a recognition result check screen with the recognition result data stored in the recognition result DB 260.

The output unit 279 outputs, via the communication unit 298, the recognition result check screen generated by the display screen generating unit 278. That is, via the communication unit 298, the output unit 279 causes the terminal apparatus 400 to display, on a World Wide Web (web) browser, the recognition result check screen generated by the display screen generating unit 278.

The definition registering unit 290 of the embodiment includes an operation receiving unit 291, a display control unit 292, a definition generating unit 293, and a definition updating unit 294.

Via the communication unit 298, the operation receiving unit 291 receives an operation performed on a screen displayed on the web browser of the terminal apparatus 400. More specifically, in the embodiment, the communication unit 298 receives information representing the operation from the terminal apparatus 400, and the operation receiving unit 291 receives input of the information received by the communication unit 298.

Via the communication unit 298, the display control unit 292 (i.e., a first display control unit) instructs the terminal apparatus 400 to display a screen. Specifically, the display control unit 292 causes the terminal apparatus 400 to display a screen for generating the individual company description definition information 251. The display control unit 292 further generates a file in the extensible markup language (XML) format for displaying the screen. Then, via the communication unit 298, the display control unit 292 causes the terminal apparatus 400 to display an input screen on the web browser.

Although the display control unit 292 of the embodiment causes the terminal apparatus 400 to display the screen for generating the individual company description definition information 251, the apparatus caused to display the screen is not limited to the terminal apparatus 400. The apparatus caused to display the screen by the display control unit 292 may be the server 200 or an apparatus other than the terminal apparatus 400. The apparatus caused to display the screen by the display control unit 292 may be any display device with a display function.

The definition generating unit 293 generates the individual company description definition information 251 based on the information input to the input screen and received from the terminal apparatus 400, and stores the generated individual company description definition information 251 in the description definition DB 250.

If the recognition result data is corrected, the definition updating unit 294 reflects the correction in the individual company description definition information 251 already registered in the description definition DB 250, to thereby update the individual company description definition information 251.

The communication unit 298 of the embodiment is a function implemented by the network I/F 209, for example, to enable the server 200 to transmit and receive data to and from an external apparatus. Specifically, for example, the communication unit 298 transmits a notification instructing to display the screen to the terminal apparatus 400 under the control of the display control unit 292.

Functions of the terminal apparatus 400 of the embodiment will be described with reference to FIG. 10.

Figure 10:
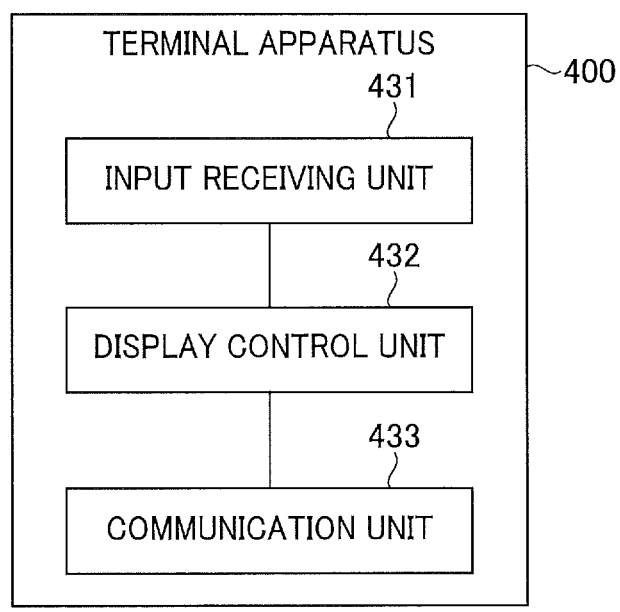
FIG. 10 is a diagram illustrating functions of the terminal apparatus of the embodiment.

FIG. 10 is a diagram illustrating functions of the terminal apparatus 400. The function of each of the following units of the terminal apparatus 400 is implemented when the CPU 401 of the terminal apparatus 400 reads and executes a program from a memory such as the ROM 402.

The terminal apparatus 400 of the embodiment includes an input receiving unit 431, a display control unit 432, and a communication unit 433.

The input receiving unit 431 receives the input to the screen displayed on the web browser of the terminal apparatus 400 by the display control unit 432.

The display control unit 432 (i.e., a second display control unit) controls the display of the display 418 of the terminal apparatus 400. Specifically, the display control unit 432 causes the display 418 (i.e., a display device) to display the screen according to the instruction from the server 200.

The communication unit 433 is a function implemented by the antenna 412*a* for the telecommunication circuit 412, for example, to enable the terminal apparatus 400 to transmit and receive data to and from another apparatus.

An operation of the ledger sheet recognition system 100 of the embodiment will be described with reference to FIGS. 11A and 11B.

Figure 11A:
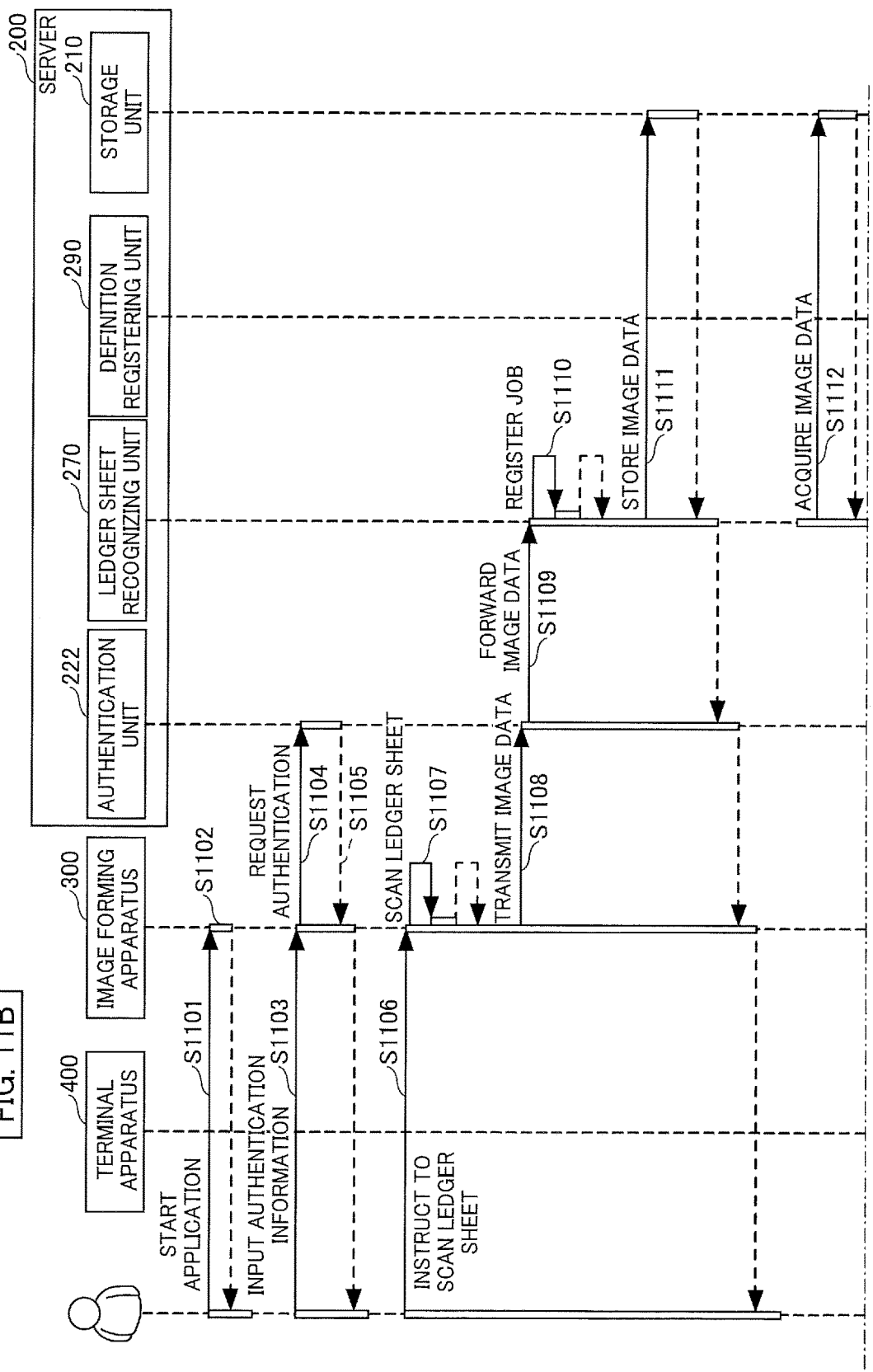
FIGS. 11A and 11B are a sequence diagram illustrating an operation of the ledger sheet recognition system of the embodiment.
Figure 11B:
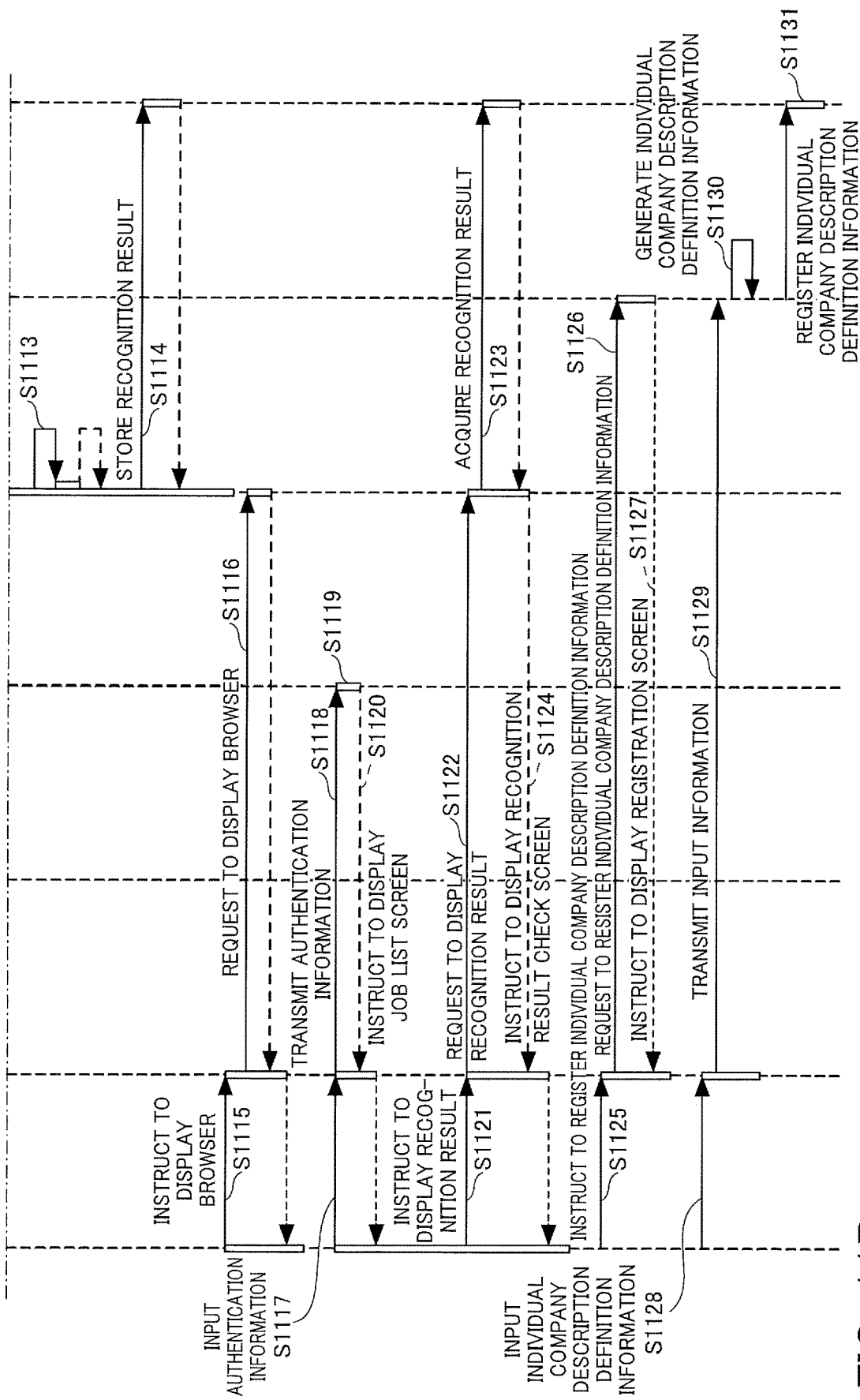

FIGS. 11A and 11B are a sequence diagram illustrating an operation of the ledger sheet recognition system 100.

In the ledger sheet recognition system 100, the image forming apparatus 300 receives a request from the user to start an application for executing the ledger sheet recognition (step S1101), and starts the application (step S1102).

The image forming apparatus 300 then receives input of authentication information from the user (step S1103), and transmits the authentication information to the server 200 to request authentication (step S1104).

In response to receipt of the authentication request, the server 200 performs the authentication with the authentication unit 222, and transmits a result of the authentication to the image forming apparatus 300 (step S1105). The processes described below are performed when the user is authenticated.

The image forming apparatus 300 then receives an instruction to scan the ledger sheet (step S1106), and scans the ledger sheet to acquire the ledger sheet image data (step S1107). The image forming apparatus 300 then transmits the ledger sheet image data to the server 200 (step S1108).

In the server 200, the input receiving unit 221 receives the input of the ledger sheet image data, and the authentication unit 222 transmits the ledger sheet image data to the ledger sheet recognizing unit 270 (step S1109). In the example of FIG. 9, the ledger sheet image data is transmitted to the ledger sheet recognizing unit 270 via the authentication unit 222. However, the transmission of the ledger sheet image data is not limited thereto. The ledger sheet image data may be transmitted to the ledger sheet recognizing unit 270 without via the authentication unit 222.

In the ledger sheet recognizing unit 270 of the server 200, in response to receipt of the ledger sheet image data, the job list generating unit 272 registers a job in the job list (step S1110). Then, in the ledger sheet recognizing unit 270, the image data storing unit 271 stores the ledger sheet image data in the ledger sheet image DB 230 (step S1111).

Then, with the image data acquiring unit 273, the ledger sheet recognizing unit 270 acquires the ledger sheet image data to be recognized from the ledger sheet image DB 230 (step S1112). The ledger sheet recognizing unit 270 then executes the process of recognizing the ledger sheet image (step S1113). Details of the process of step S1113 will be described later.

Then, the ledger sheet recognizing unit 270 stores the recognition result data generated by the item extracting unit 277 in the recognition result DB 260 (step S1114).

In the ledger sheet recognition system 100, the input receiving unit 431 of the terminal apparatus 400 receives input of a browser display instruction from the user (step S1115). Then, via the communication unit 433, the terminal apparatus 400 transmits a browser display request to the server 200 to display the browser for displaying the recognition result data (step S1116).

Further, in the terminal apparatus 400, the input receiving unit 431 receives input of authentication information from the user (step S1117), and the communication unit 433 transmits the authentication information to the server 200 (step S1118).

With the authentication unit 222, the server 200 performs the authentication of the user (step S1119). The server 200 then transmits a result of the authentication to the terminal apparatus 400, and causes the terminal apparatus 400 to display the job list (step S1120). The processes described here are performed when the user is authenticated.

Then, in the terminal apparatus 400, the input receiving unit 431 receives the selection of a job from the job list as an instruction to display the recognition result of the ledger sheet image (step S1121), and the communication unit 433 transmits a display request to the server 200 (step S1122).

In response to receipt of the display request, the server 200 acquires the recognition result data from the recognition result DB 260 (step S1123). The server 200 then generates the recognition result check screen, and causes the terminal apparatus 400 to display the recognition result check screen on the browser of the terminal apparatus 400 (step S1124), to thereby enable the user to check the recognition result on the displayed recognition result check screen.

Then, in the terminal apparatus 400, the input receiving unit 431 receives input of an instruction to register the individual company description definition information 251 (step S1125), and the communication unit 433 transmits a request to register the individual company description definition information 251 to the server 200 (step S1126).

In the server 200, in response to receipt of the registration request, the display control unit 292 of the definition registering unit 290 causes the terminal apparatus 400 to display a registration screen for registering the individual company description definition information 251 (step S1127).

Then, the terminal apparatus 400 receives input of the individual company description definition information 251 (step S1128), and transmits the input information to the server 200 (step S1129). Based on the information transmitted from the terminal apparatus 400, the server 200 generates the individual company description definition information 251 with the definition generating unit 293 (step S1130), and stores the generated individual company description definition information 251 in the description definition DB 250 (step S1131). Thereby, the operation of the ledger sheet recognition system 100 is completed. Details of the process of the definition registering unit 290 will be described later.

The job list generated by the job list generating unit 272 of the embodiment will be described with reference to FIG. 12.

FIG. 12 is a diagram illustrating an example of the job list. In the server 200 of the embodiment, in response to receipt of the ledger sheet image data from the image forming apparatus 300, the job list generating unit 272 holds the ledger sheet image data and a job ID associated therewith as a job list.

A job list 101 of the embodiment includes information items "job ID," "user ID," "ledger sheet image file path," "recognition result file path," and "status."

The value of the information item "job ID" is an identifier for identifying the job, i.e., an identifier for identifying the ledger sheet image data received from the image forming apparatus 300.

The value of the information item "user ID" is an identifier for identifying the user who has logged in to the ledger sheet recognition system 100.

The value of the information item "ledger sheet image file path" is information representing the storage location of the ledger sheet image data.

The value of the information item "recognition result file path" is information representing the storage location of the recognition result data representing the recognition result of the ledger sheet image.

The value of the information item "status" represents the progress of the recognition of the ledger sheet image. That is, the value of the information item "status" represents the state of the job.

In the embodiment, the value of the information item "status" is one of four statuses: unprocessed, saved as draft, confirmed, and externally output, which are defined as follows.

The unprocessed status (a first status) is a state immediately after the acquisition of the recognition result data through the ledger sheet recognition. In this state, operations such as checking the recognition result data have not been executed.

The saved-as-draft status (a second status) is a state in which the operations such as checking the recognition result data are ongoing and the recognition result data has not been confirmed.

The confirmed status (a third status) is a state in which the operations such as checking the recognition result data have been completed and the recognition result data has been stored in the recognition result DB 260 as confirmed information.

The externally output status (a fourth status) is a state in which the recognition result data has been output to an external system, such as an accounting system, which cooperates with the ledger sheet recognition system 100.

In the server 200 of the embodiment, in response to receipt of the ledger sheet image data from the image forming apparatus 300, the job list generating unit 272 assigns a job ID to the ledger sheet image data, and adds a record of the ledger sheet image data to the job list 101 in association with the user ID acquired as the authentication information. When the ledger sheet image data is stored in the ledger sheet image DB 230, the job list generating unit 272 adds the information of the storage location of the ledger sheet image data to the job list 101 as the value of the information item "ledger sheet image file path."

Further, when the recognition result data is stored in the recognition result DB 260, the job list generating unit 272 adds the information of the storage location of the recognition result data to the job list 101 as the value of the information item "recognition result file path," and sets the value of the information item "status" to "confirmed."

In the embodiment, the job list 101 generated by the job list generating unit 272 may be displayed, for example. In this case, the user is able to check the progress of the recognition of the ledger sheet image via a job list screen displayed based on the job list 101.

The process of the ledger sheet recognizing unit 270 of the embodiment will be described with reference to FIGS. 13A and 13B.

Figure 13B:
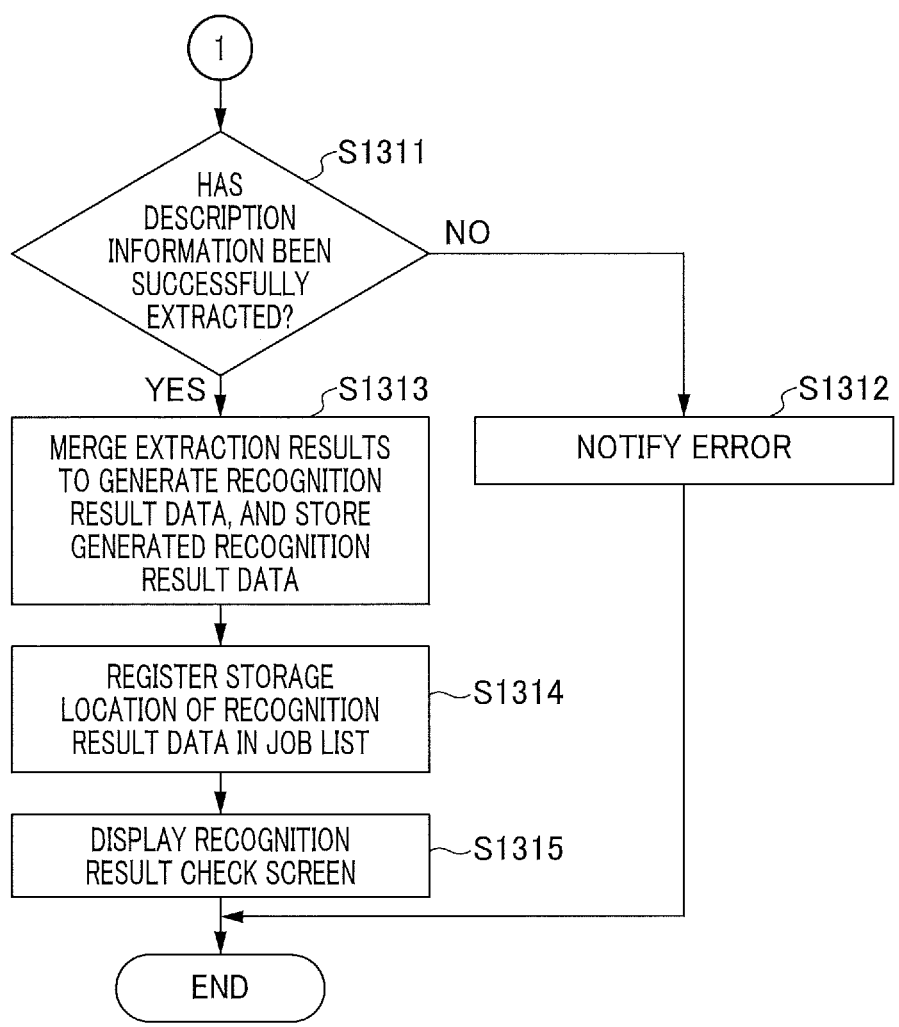

FIGS. 13A and 13B are a flowchart illustrating an example of the process of the ledger sheet recognizing unit 270. FIGS. 13A and 13B illustrate details of the process of step S1113 in FIG. 11B. FIGS. 13A and 13B illustrate a process performed when a plurality of ledger sheet image data items are received from the image forming apparatus 300.

The ledger sheet recognizing unit 270 of the embodiment receives the selection of a job from the job list 101 (step S1301). Then, the preprocessing unit 274 performs the preprocessing for the ledger sheet recognition on the ledger sheet image data acquired by the image data acquiring unit 273 (step S1302). Specifically, the preprocessing includes a correction process to adjust the orientation of the ledger sheet image, for example.

Then, in the ledger sheet recognizing unit 270, the character recognizing unit 275 clips characters from character fields in the ledger sheet image, and performs character recognition on the clipped characters (step S1303). The character fields are the areas in which the characters are formed. In this process, the character recognizing unit 275 further acquires the coordinates representing the positions of the clipped characters.

Then, the ledger sheet recognizing unit 270 generates the reading result data based on the relative positions of character strings recognized by the character recognizing unit 275, and holds the generated reading result data (step S1304). Specifically, based on the coordinates of the recognized characters, the ledger sheet recognizing unit 270 recognizes characters separated from each other by a distance equal to or less than a preset threshold value as one character string. Then, the ledger sheet recognizing unit 270 generates the reading result data by associating the character string with information such as the coordinates representing the position of the area in which the character string is formed.

Then, in the ledger sheet recognizing unit 270, the definition identifying unit 276 identifies the business type of the biller by referring to the business type determination DB 240 and biller information for identifying the biller included in the reading result data (step S1305).

Then, in the ledger sheet recognizing unit 270, the definition identifying unit 276 determines whether the description definition DB 250 includes the individual company description definition information 251 corresponding to the biller information (step S1306).

If it is determined at step S1306 that the description definition DB 250 includes the individual company description definition information 251 corresponding to the biller information (YES at step S1306), the item extracting unit 277 of the ledger sheet recognizing unit 270 extracts the description information based on the individual company description definition information 251 (step S1307). Then, the ledger sheet recognizing unit 270 proceeds to the process of step S1311, which will be described later. Details of the process of step S1307 will also be described later.

If it is determined at step S1306 that the description definition DB 250 does not include the individual company description definition information 251 corresponding to the biller information (NO at step S1306), the definition identifying unit 276 determines whether the description definition DB 250 includes the business type description definition information 252 corresponding to the business type identified at step S1305 (step S1308).

If it is determined at step S1308 that the description definition DB 250 includes the business type description definition information 252 corresponding to the identified business type (YES at step S1308), the item extracting unit 277 of the ledger sheet recognizing unit 270 extracts the description information based on the business type description definition information 252 (step S1309). Then, the ledger sheet recognizing unit 270 proceeds to the later-described process of step S1311. Details of the process of step S1309 will be described later.

If it is determined at step S1308 that the description definition DB 250 does not include the business type description definition information 252 corresponding to the identified business type (NO at step S1308), the item extracting unit 277 extracts the description information based on the general-purpose description definition information 253 (step S1310). Then, the ledger sheet recognizing unit 270 proceeds to the later-described process of step S1311. Details of the process of step S1310 will be described later.

The ledger sheet recognizing unit 270 determines whether the description information has been successfully extracted (step S1311). Specifically, the ledger sheet recognizing unit 270 determines whether there is description information extracted in the process of step S1307, S1309, or step S1310.

If it is determined at step S1311 that the description information has failed to be extracted (NO at step S1311), the ledger sheet recognizing unit 270 notifies the terminal apparatus 400 or the image forming apparatus 300 of an error (step S1312), and completes the process thereof.

If it is determined at step S1311 that the description information has been successfully extracted (YES at step S1311), the item extracting unit 277 of the ledger sheet recognizing unit 270 generates the recognition result data by merging the items of the extracted description information, and stores the generated recognition result data in the recognition result DB 260 (step S1313).

The job list generating unit 272 of the ledger sheet recognizing unit 270 then registers the storage location of the recognition result data in the job list 101 (step S1314).

Then, the display screen generating unit 278 of the ledger sheet recognizing unit 270 causes the terminal apparatus 400 to display the recognition result check screen generated with the recognition result data (step S1315). Then, the ledger sheet recognizing unit 270 completes the process thereof.

In the example of FIGS. 13A and 13B, the process up to the step of causing the terminal apparatus 400 to display the recognition result data has been described as one sequence of steps. The process of the ledger sheet recognizing unit 270, however, is not limited to this example. The ledger sheet recognizing unit 270 may cause the terminal apparatus 400 to display the recognition result data in response to receipt of the request to display the recognition result data from the terminal apparatus 400.

The extraction of the description information by the item extracting unit 277 of the embodiment will be described with reference to FIGS. 14 and 15.

Figure 14:
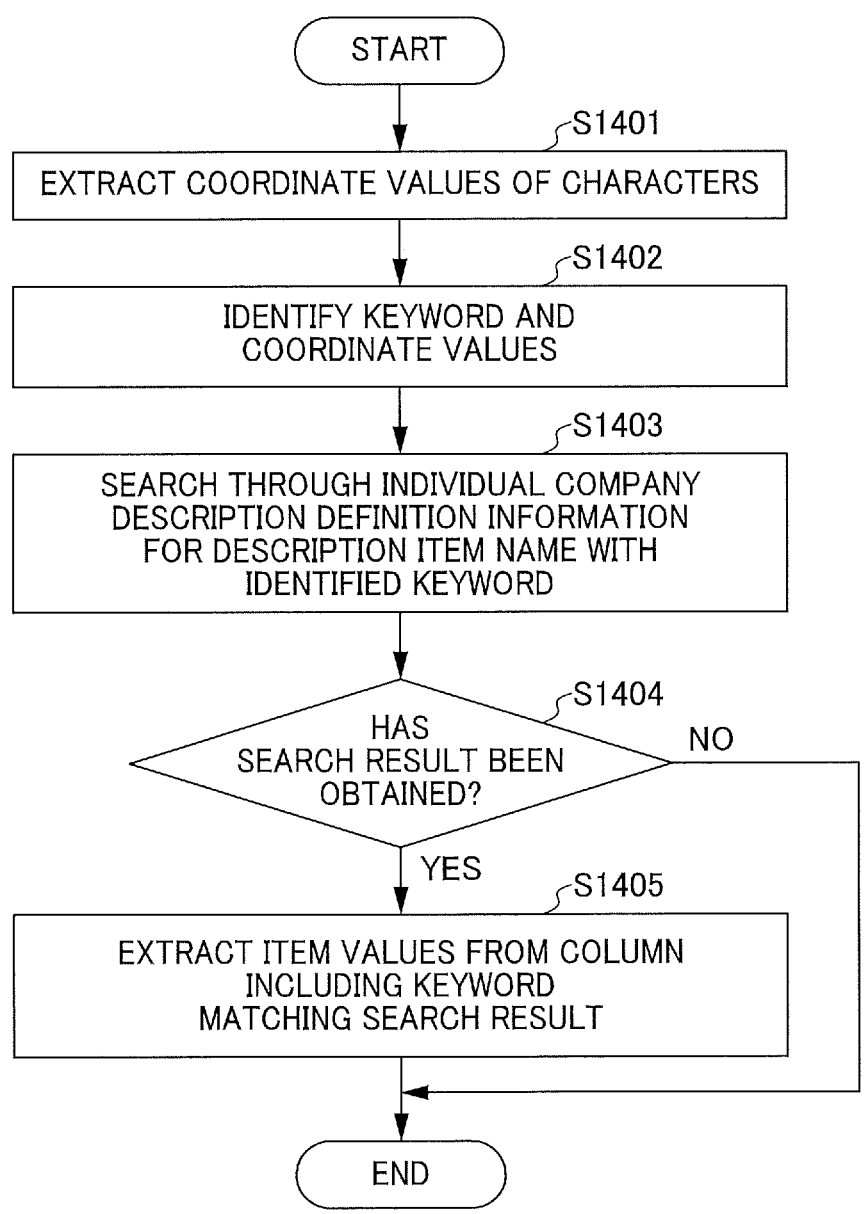
FIG. 14 is a flowchart illustrating another example of the process of the ledger sheet recognizing unit of the embodiment.

FIG. 14 is a flowchart illustrating another example of the process of the ledger sheet recognizing unit 270. FIG. 14 illustrates details of the process of step S1307 in FIG. 13A.

In the ledger sheet recognizing unit 270 of the embodiment, when the reading result data is held, the item extracting unit 277 extracts the coordinate values of the characters (step S1401). The item extracting unit 277 then identifies a keyword (i.e., character string) based on the extracted coordinate values of the characters, and identifies the coordinate values corresponding to the keyword (step S1402).

Then, with the identified keyword, the item extracting unit 277 searches through the individual company description definition information 251 for the corresponding description item name (step S1403), and determines whether a search result has been obtained (step S1404). Specifically, the item extracting unit 277 determines whether the individual company description definition information 251 includes the description item name matching the identified keyword.

If it is determined at step S1404 that the individual company description definition information 251 does not include the description item name corresponding to the identified keyword (NO at step S1404), the ledger sheet recognizing unit 270 completes the process thereof. If it is determined at step S1404 that the individual company description definition information 251 includes the corresponding description item name (YES at step S1404), the ledger sheet recognizing unit 270 determines the identified keyword as the description item name in the description section, and extracts keywords vertically arranged under the identified keyword as the item values of the description item name (step S1405). Then, the ledger sheet recognizing unit 270 completes the process thereof.

The process of step S1309 in FIG. 13A is similar to the process of FIG. 14 except that the description definition information to be referred to at step S1403 in FIG. 14 is replaced by the business type description definition information 252, and thus description thereof will be omitted.

Figure 15A:
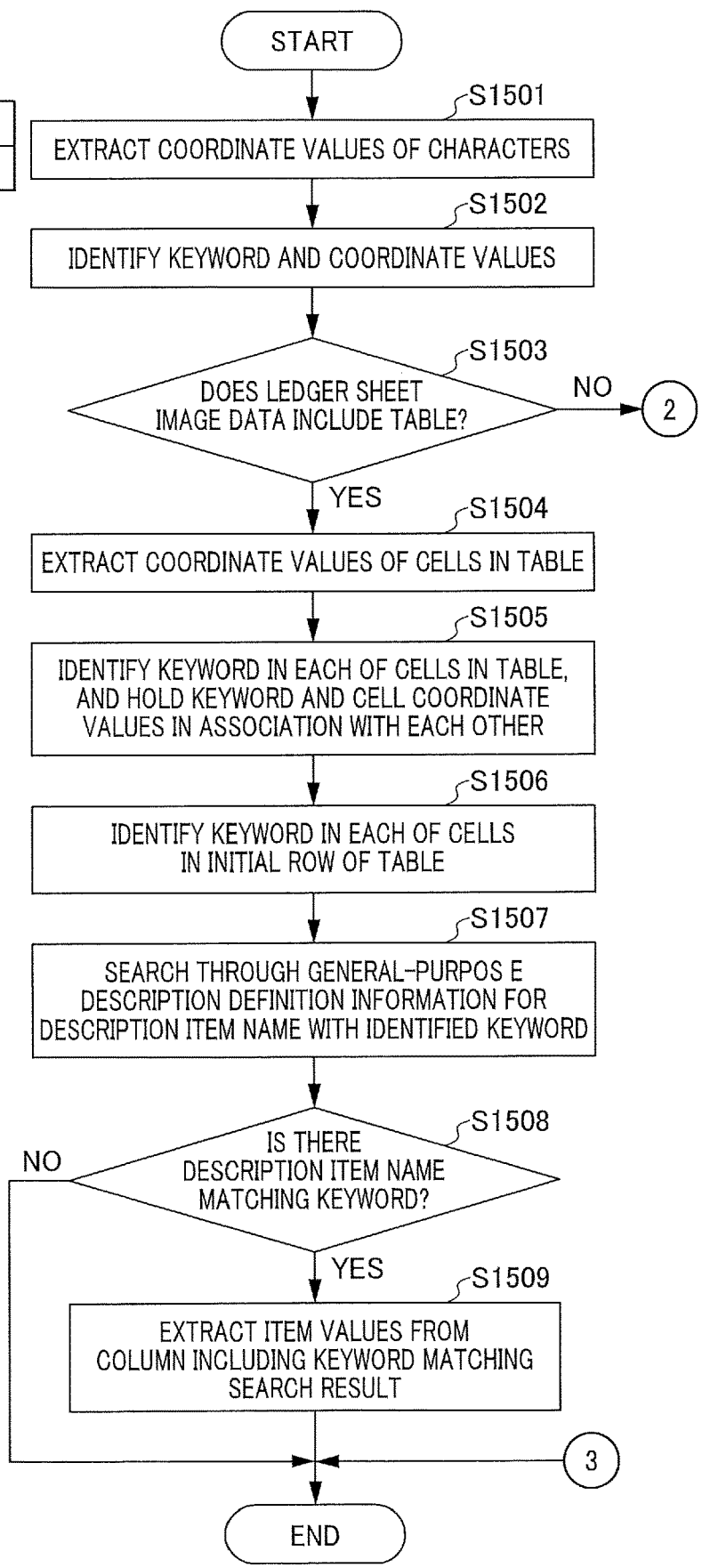
FIGS. 15A and 15B are a flowchart illustrating another example of the process of the ledger sheet recognizing unit of the embodiment.
Figure 15B:
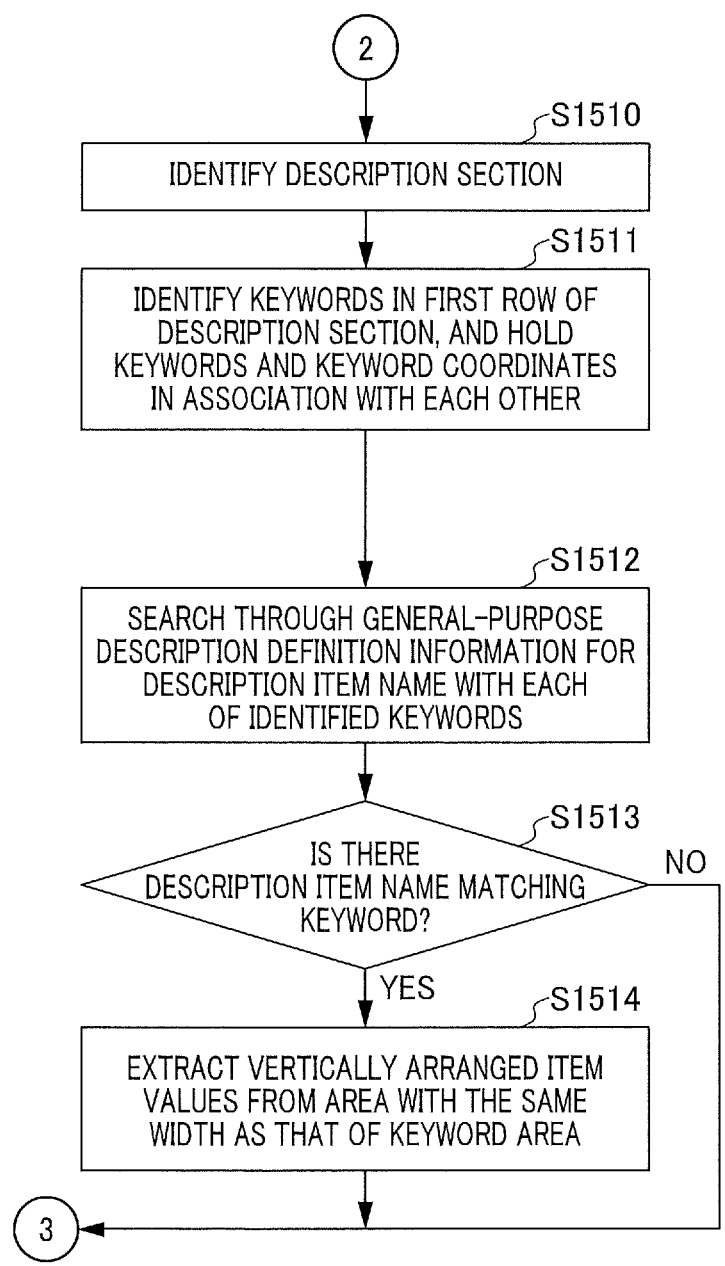

FIGS. 15A and 15B are a flowchart illustrating another example of the process of the ledger sheet recognizing unit 270. FIGS. 15A and 15B illustrate details of the process of step S1310 in FIG. 13A. That is, FIGS. 15A and 15B illustrate a process of extracting the description information by referring to the general-purpose description definition information 253 when the description definition DB 250 does not include the individual company description definition information 251 or the business type description definition information 252 corresponding to the biller.

The processes of steps S1501 and S1502 in FIG. 15A are similar to those of steps S1401 and S1402 in FIG. 14, and thus description thereof will be omitted.

After the keyword and the coordinate values are identified, the item extracting unit 277 determines whether the ledger sheet image data includes a table (step S1503). If it is determined at step S1503 that the ledger sheet image data does not include a table (NO at step S1503), the item extracting unit 277 proceeds to the process of step S1510, which will be described later.

If it is determined at step S1503 that the ledger sheet image data includes a table (YES at step S1503), the item extracting unit 277 extracts the coordinate values of the cells in the table (step S1504). In this step, the item extracting unit 277 may assign identification information (e.g., an ID) to each of the cells to identify the cell. For example, the identification information assigned to the cell may include a column ID for identifying the column in the table corresponding to the cell and a row ID for identifying the row in the table corresponding to the cell, for example. With the column ID and the row ID thus assigned to the cell, the cell is identified with the combination of the column ID and the row ID.

The item extracting unit 277 then identifies the keyword included in each of the cells in the table, and holds the keyword and the coordinate values of the cell in association with each other (step S1505).

Then, the item extracting unit 277 identifies the keyword included in each of the cells in the initial (i.e., uppermost) row of the table (step S1506). Then, with the keyword included in each of the cells in the initial row, the item extracting unit 277 searches through the general-purpose description definition information 253 for the corresponding description item name (step S1507).

The item extracting unit 277 then determines whether the general-purpose description definition information 253 includes the description item name matching the keyword included in each of the cells in the initial row (step S1508). If it is determined at step S1508 that the general-purpose description definition information 253 does not include the description item name matching the keyword included in each of the cells in the initial row (NO at step S1508), the item extracting unit 277 completes the process thereof.

If it is determined at step S1508 that the general-purpose description definition information 253 includes the description item name matching the keyword included in each of the cells in the initial row (YES at step S1508), the item extracting unit 277 determines the keyword included in each of the cells in the initial row as the description item name, and extracts keywords included in the column including the keyword as the item values of the description item (step S1509). Then, the ledger sheet recognizing unit 270 completes the process thereof.

If it is determined at step S1503 that the ledger sheet image data does not include a table (NO at step S1503), the ledger sheet recognizing unit 270 identifies the area of the description section in the ledger sheet image (step S1510). Specifically, the ledger sheet recognizing unit 270 may identify the area including vertically arranged keywords as the area of the description section, for example.

Then, with the item extracting unit 277, the ledger sheet recognizing unit 270 identifies the keywords in the first row of the area identified as the description section, and holds the identified keywords and the respective coordinate values thereof in association with each other (step S1511). The keywords in the first row of the area identified as the description section are the keywords located uppermost in the identified area.

Then, with each of the keywords identified at step S1511, the item extracting unit 277 searches through the general-purpose description definition information 253 for the corresponding description item name (step S1512). The item extracting unit 277 then determines whether the general-purpose description definition information 253 includes the description item name matching each of the identified keywords (step S1513).

If it is determined at step S1513 that the general-purpose description definition information 253 does not include the description item name matching each of the identified keywords (NO at step S1513), the ledger sheet recognizing unit 270 completes the process thereof.

If it is determined at step S1513 that the general-purpose description definition information 253 includes the description item name matching each of the identified keywords (YES at step S1513), the item extracting unit 277 acquires, based on the coordinate values of each of the keywords identified at step S1511, the width of the area circumscribed about the character string representing the keyword. Then, the item extracting unit 277 extracts keywords vertically arranged in an area with this width as the item values of the description item (step S1514). Then, the ledger sheet recognizing unit 270 completes the process thereof.

In the above-described example of FIGS. 15A and 15B, if the ledger sheet image includes a table, the coordinate values of the cells in the table are extracted. The table, however, may be replaced by vertical lines. In this case, the ledger sheet recognizing unit 270 determines whether the ledger sheet image includes vertical lines. If it is determined that the ledger sheet image includes vertical lines, the keywords located between the vertical lines and the coordinates of the keywords may be identified.

If the general-purpose description definition information 253 includes the description item name matching an uppermost one of the keywords located between the vertical lines, the ledger sheet recognizing unit 270 may determine the second and subsequent keywords located under the uppermost keyword between the vertical lines as the values of the description item.

The process of the ledger sheet recognizing unit 270 will be further described with reference to FIG. 16 and FIGS. 17A and 17B.

FIG. 16 is a diagram illustrating the extraction of the description information. An invoice 161 illustrated in FIG. 16 includes biller information 161a that identifies the biller and a description section 161b in which the same format of data is repeatedly printed vertically for each description item. In the invoice 161 of FIG. 16, the biller information 161a represents the name of the biller, and the description section 161b is described in table format.

In the embodiment, the invoice 161 is read by the image forming apparatus 300 to obtain the ledger sheet image data. The ledger sheet image data is then subjected to the process of the ledger sheet recognizing unit 270 to generate the recognition result data.

FIGS. 17A and 17B are diagrams illustrating the extraction of the description information. Information 171 illustrated in FIG. 17A represents a result of character recognition performed on the ledger sheet image data of the invoice 161 by the character recognizing unit 275.

The information 171 is an example of information extracted from the recognition result of the characters in the character fields clipped from the description section 161b and the coordinates representing the positions of the characters.

The character recognizing unit 275 of the embodiment connects neighboring characters in the information 171 to recognize a character string. Specifically, the character recognizing unit 275 may recognize one word as a combination of characters separated from each other by a distance equal to or less than the length of a predetermined number of pixels.

Information 172 illustrated in FIG. 17A includes the character strings recognized by the character recognizing unit 275 and the information of the areas of the character strings. That is, the information 172 is the reading result data obtained from the ledger sheet image by the character recognizing unit 275.

The character recognizing unit 275 further recognizes each of areas in the ledger sheet image data divided by vertical lines and horizontal lines as a cell, and assigns, to the cell, identification information for identifying the cell (i.e., a cell ID).

Information 173 illustrated in FIG. 17A represents the association between the areas recognized as the cells in the description section 161b and the respective cell IDs.

For example, in FIG. 17A, the area in which a keyword "name of article" is recognized is identified in the information 172 based on the height and width of the keyword with reference to a position represented by the X-coordinate and the Y-coordinate.

It is also understood from the information 173 that the area in which keyword "name of article" is recognized corresponds to a cell with a cell ID "2." The keyword "name of article" is therefore associated with the cell ID "2" as a keyword included in the description section 161b. In the information 173, the cell ID is thus associated with the area in which keyword "name of article" is recognized. However, the cell ID is not limited to this example. The cell ID may be replaced by the column ID for identifying the corresponding column in which keywords are vertically arranged and the row ID for identifying the corresponding row in which keywords are horizontally arranged.

The ledger sheet recognizing unit 270 of the embodiment thus associates the keywords and the cells in the ledger sheet image data with each other.

Information 174 illustrated in FIG. 17B is the description information of the description section 161b generated based on the reading result data corresponding to the invoice 161. The information 174 (hereinafter referred to as the description information 174) illustrated in FIG. 17B is therefore part of the recognition result data of the entire ledger sheet image data.

The description information 174 illustrated in FIG. 17B, which is generated by the item extracting unit 277, includes information items "column ID," "description item name," "column coordinates," "row ID," "item value," and "specification of description item."

The value of the information item "column ID" is the identification information identifying a column included in the table corresponding to the description section 161b. The value of the information item "description item name" is the keyword included in the corresponding cell in the uppermost row of the table. The value of the information item "column coordinates" is the coordinates of the column. In the embodiment, the column coordinates are the coordinate values of the upper-left point and the lower-right point of the column in the description section 161b of the ledger sheet image.

The value of the information item "row ID" is the identification information identifying a row. The value of the information item "item value" is the item value of the corresponding description item.

The value of the information item "specification of description item" is specification of whether or not to register the corresponding description item name and the coordinates representing the position of the description item name in the individual company description definition information 251. The coordinates representing the position of the description item name are represented by the combination of the column coordinates and the row ID, for example.

In the description information 174, a value "name of article" of the information item "description item name" is associated with a value "article name" of the information item "specification of description item," and the coordinates representing the position of the value "name of article" are described as the column coordinates.

In this case, the value "name of article" and the column coordinates thereof are registered in the individual company description definition information 251 as the value of the information item "extracted information" corresponding to the value "article name" of the information item "description item name."

The example of the description information 174 in FIG. 17B includes the information items "column coordinates," "column ID," and "row ID." However, the information items of the description information 174 are not limited thereto. It suffices if the description information 174 includes the information items "description item name" and "item value," and the other information items may not be included in the description information 174.

Further, in the embodiment, when the description information 174 is displayed on the recognition result check screen, the information items displayed as the description information 174 may be limited to the description item name and the item value.

The generation of the description information 174 by the item extracting unit 277 will be described with specific examples.

A description will first be given of the generation of the description information 174 by the item extracting unit 277 with reference to the individual company description definition information 251. The following description will be given of a specific example of the process of FIG. 14.

In this case, when the keyword "name of article" and the values of the keyword coordinates thereof are identified in the information 173, for example, the item extracting unit 277 searches through the individual company description definition information 251 for the corresponding description item name with the keyword "name of article."

In the present example, the individual company description definition information 251 includes the keyword "name of article" (see FIG. 8). The item extracting unit 277 therefore extracts the keyword "name of article" as the description item name. The item extracting unit 277 further extracts, as the item values of the description item, the keywords arranged under the keyword "name of article" obtained from the values of the keyword coordinates of the keyword "name of article."

In this process, the item extracting unit 277 extracts the coordinates (i.e., the column ID and the column coordinates) representing the position of the keyword "name of article," and associates the extracted coordinates with the keyword "name of article" corresponding to the description item name. The item extracting unit 277 further associates, for example, a keyword "A" extracted as an item value with the coordinates (i.e., the column ID and the row ID) representing the position of the keyword "A" (i.e., the item value).

A description will be given of the generation of the description information 174 by the item extracting unit 277 with reference to the business type description definition information 252.

In this case, too, when the keyword "name of article" and the values of the keyword coordinates thereof are identified in the information 173, for example, the item extracting unit 277 searches through the business type description definition information 252 for the corresponding description item name with the keyword "name of article." The business type description definition information 252 includes the keyword "name of article" (see FIG. 7). The item extracting unit 277 therefore extracts the keyword "name of article" as the description item name. The item extracting unit 277 further extracts, as the item values of the description item, the keywords arranged under the keyword "name of article" obtained from the values of the keyword coordinates of the keyword "name of article."

In this process, too, the item extracting unit 277 associates the keyword "name of article" corresponding to the description item name with the coordinates representing the position of the keyword "name of article." The item extracting unit 277 further associates each of the keywords extracted as the item values with the coordinates representing the position of the keyword (i.e., the item value).

A description will be given of the generation of the description information 174 by the item extracting unit 277 with reference to the general-purpose description definition information 253. The following description will be given of a specific example of the process of FIGS. 15A and 15B.

In this case, when the keyword "name of article" and the values of the keyword coordinates thereof are identified in the information 173, for example, the item extracting unit 277 determines whether the description section 161*b* includes a table. In the present example, the description section 161*b* is in table format, as illustrated in FIG. 1, and thus the item extracting unit 277 determines that the description section 161*b* includes a table.

The item extracting unit 277 therefore extracts, from the information 173, the coordinate values of the cells included in the table representing the description section 161*b*, and holds the coordinate values of the cells and the keywords in the cells in association with each other.

In the example of FIG. 17A, the coordinate values of the cell with the cell ID "2" and the keyword "name of article" are held in association with each other, and the coordinate values of the cell with the cell ID "7" and the keyword "article price" are held in association with each other.

Then, the item extracting unit 277 identifies the keywords included in the uppermost row of the table. In the present example, the keywords "name of article" and "article price" are identified as the keywords included in the uppermost row of the table.

The item extracting unit 277 then searches through the general-purpose description definition information 253 for the corresponding description item name with each of the identified keywords. In the present example, the general-purpose description definition information 253 does not include the keyword "name of article" (see FIG. 6). The item extracting unit 277 therefore does not extract an item value for the keyword "name of article."

As described above, in the embodiment, the description item names are first extracted from the description section 161*b* with reference to the individual company description definition information 251. According to the embodiment, therefore, the description item names personally used by the biller and the item values are extractable in association with each other. That is, according to the embodiment, the description information is extractable from the description section of the ledger sheet with reference to the individual company description definition information 251.

Further, according to the embodiment, if the description definition DB 250 does not include the individual company description definition information 251 corresponding to the biller, the description item names and the item values are extracted with reference to the business type description definition information 252 corresponding to the business type of the biller. According to the embodiment, therefore, the description item names specific to the business type of the biller and the item values are extractable in association with each other even if the description definition DB 250 does not include the individual company description definition information 251 corresponding to the biller. That is, according to the embodiment, the description information is extractable from the description section of the ledger sheet with reference to the business type description definition information 252.

Further, according to the embodiment, if the description definition DB 250 does not include the individual company description definition information 251 or the business type description definition information 252 corresponding to the biller, the general-purpose description definition information 253 is referred to. Moreover, in the embodiment, if any of the description item names described in the description section 161b is not included in the general-purpose description definition information 253, it is possible to register, as the individual company description definition information 251, the description item name that should be newly extracted and the information representing the description position of the description item name in the ledger sheet image.

The registration of the individual company description definition information 251 by the definition registering unit 290 will be described with reference to FIGS. 18 and 19.

Figure 18:
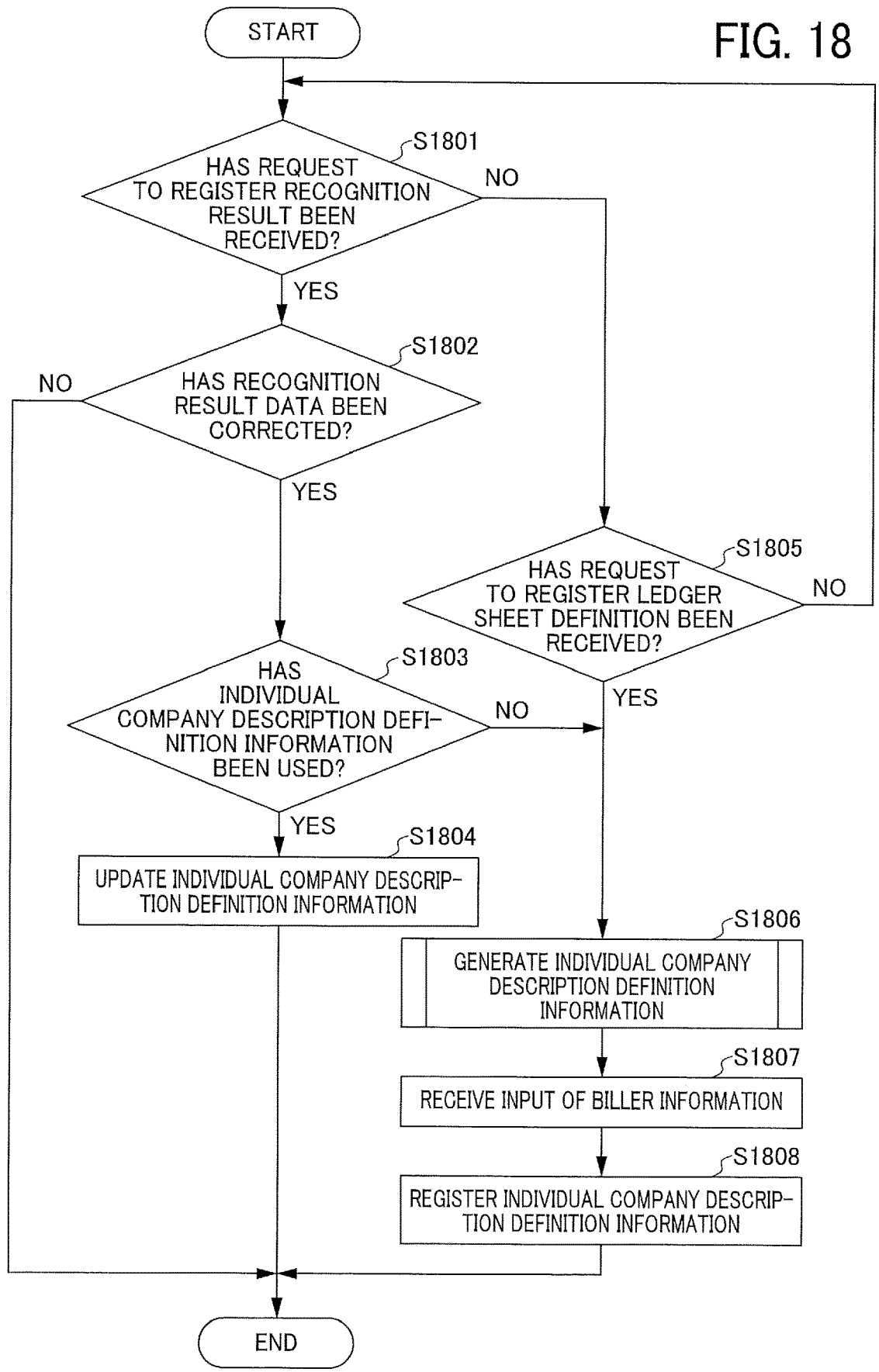
FIG. 18 is a flowchart illustrating an example of the process of a definition registering unit in the server of the embodiment.

FIG. 18 is a flowchart illustrating a process of the definition registering unit 290. FIG. 18 illustrates details of the processes of steps S1124 to S1131 in FIG. 11B.

The server 200 of the embodiment determines whether a request to register the recognition result has been received from the terminal apparatus 400, i.e., whether the registration request has been received on the recognition result check screen for checking the result of the ledger sheet recognition by the ledger sheet recognizing unit 270 (step S1801). Specifically, the server 200 determines whether an instruction to store the recognition result data displayed on the recognition result check screen into the recognition result DB 260 has been received.

If it is determined at step S1801 that the request to register the recognition result has not been received (NO at step S1801), the server 200 proceeds to the process of step S1805, which will be described later.

If it is determined at step S1801 that the request to register the recognition result has been received (YES at step S1801), the server 200 determines whether the recognition result data has been corrected on the recognition result check screen (step S1802). In the embodiment, the correction of the recognition result data mainly refers to the correction of the recognition result data in the description section.

If it is determined at step S1802 that the recognition result data has not been corrected (NO at step S1802), the server 200 completes the process of FIG. 18.

If it is determined at step S1802 that the recognition result data has been corrected (YES at step S1802), the definition generating unit 293 of the definition registering unit 290 determines whether the individual company description definition information 251 has been used in the recognition of the ledger sheet image data (step S1803). Specifically, the definition generating unit 293 determines whether the description definition DB 250 includes the individual company description definition information 251 associated with the biller.

If it is determined at step S1803 that the individual company description definition information 251 has not been used in the recognition of the ledger sheet image data (NO at step S1803), the definition registering unit 290 proceeds to the process of step S1806, which will be described later.

If it is determined at step S1803 that the individual company description definition information 251 has been used in the recognition of the ledger sheet image data (YES at step S1803), the definition updating unit 294 of the definition registering unit 290 updates the individual company description definition information 251 stored in the description definition DB 250 (step S1804). Then, the server 200 completes the process of FIG. 18.

If it is determined at step S1801 that the request to register the recognition result has not been received (NO at step S1801), the server 200 determines whether a request to register ledger sheet definition (i.e., the individual company description definition information 251) has been received from the terminal apparatus 400 (step S1805).

If it is determined at step S1805 that the request to register the ledger sheet definition has not been received from the terminal apparatus 400 (NO at step S1805), the server 200 returns to the process of step S1801.

If it is determined at step S1805 that the request to register the ledger sheet definition has been received from the terminal apparatus 400 (YES at step S1805), the definition generating unit 293 of the definition registering unit 290 generates the individual company description definition information 251 (step S1806). Details of the process of step S1806 will be described later.

The server 200 then receives input of the biller information from the terminal apparatus 400 (step S1807). Then, the definition generating unit 293 registers (i.e., stores) the input biller information and the individual company description definition information 251 in the description definition DB 250 in association with each other (step S1808). Then, the server 200 completes the process of FIG. 18.

The generation of the individual company description definition information 251 by the definition generating unit 293 will be described with reference to FIG. 19.

When generating the individual company description definition information 251, the definition registering unit 290 of the embodiment displays an extraction guide as superimposed on the description section of the ledger sheet image displayed on the recognition result check screen. The extraction guide is used to specify the area from which the description information (i.e., the description item names and the values of the description items) is extracted. Then, in the embodiment, the position of the extraction guide is set in the description section of the ledger sheet image displayed on the recognition result check screen, and the description information is extracted from the description section based on the extraction guide.

The extraction guide of the embodiment is an image in which areas representing particular description item names are associated with areas representing the values of description items represented by the particular description item names. That is, the extraction guide of the embodiment is an extraction guide image. The extraction guide image includes the images of lines forming rectangles two-dimensionally arranged vertically and horizontally in columns and rows and the images of characters representing the particular description item names associated with the rectangles.

In the embodiment, the extraction guide image will be described as the extraction guide. However, the extraction guide is not limited thereto. The extraction guide may be generated as lines or an object rendered on a screen, specifically lines forming rectangles two-dimensionally arranged vertically and horizontally in in columns and rows or an object formed with a plurality of highly transparent rectangles. For example, when the recognition result check screen is displayed on the browser, the extraction guide may be generated as lines or an object rendered on the browser in the JavaScript (registered trademark) programming language.

In the embodiment, the particular description item names are previously determined description item names expected to be included in a typical description section. Specifically, the particular description item names may be selected from the description item names included in the general-purpose description definition information 253, for example.

In the embodiment, an association operation is performed on the recognition result check screen to associate the areas of the particular description item names and the areas of the values of the description items in the extraction guide image with the areas of the description item names and the areas of the values of the description items in the description section.

That is, in the embodiment, the operation of setting the position of the extraction guide image in the description section of the ledger sheet image is received on the recognition result check screen. The recognition result check screen of the embodiment is therefore an example of a setting screen for setting the position of the extraction guide image.

Following the above-described operation, the definition registering unit 290 sets the extraction area of the description information based on the extraction guide image.

Then, the definition registering unit 290 of the embodiment generates the individual company description definition information 251 based on the extraction guide image, and stores the generated individual company description definition information 251 in the description definition DB 250.

Figure 19:
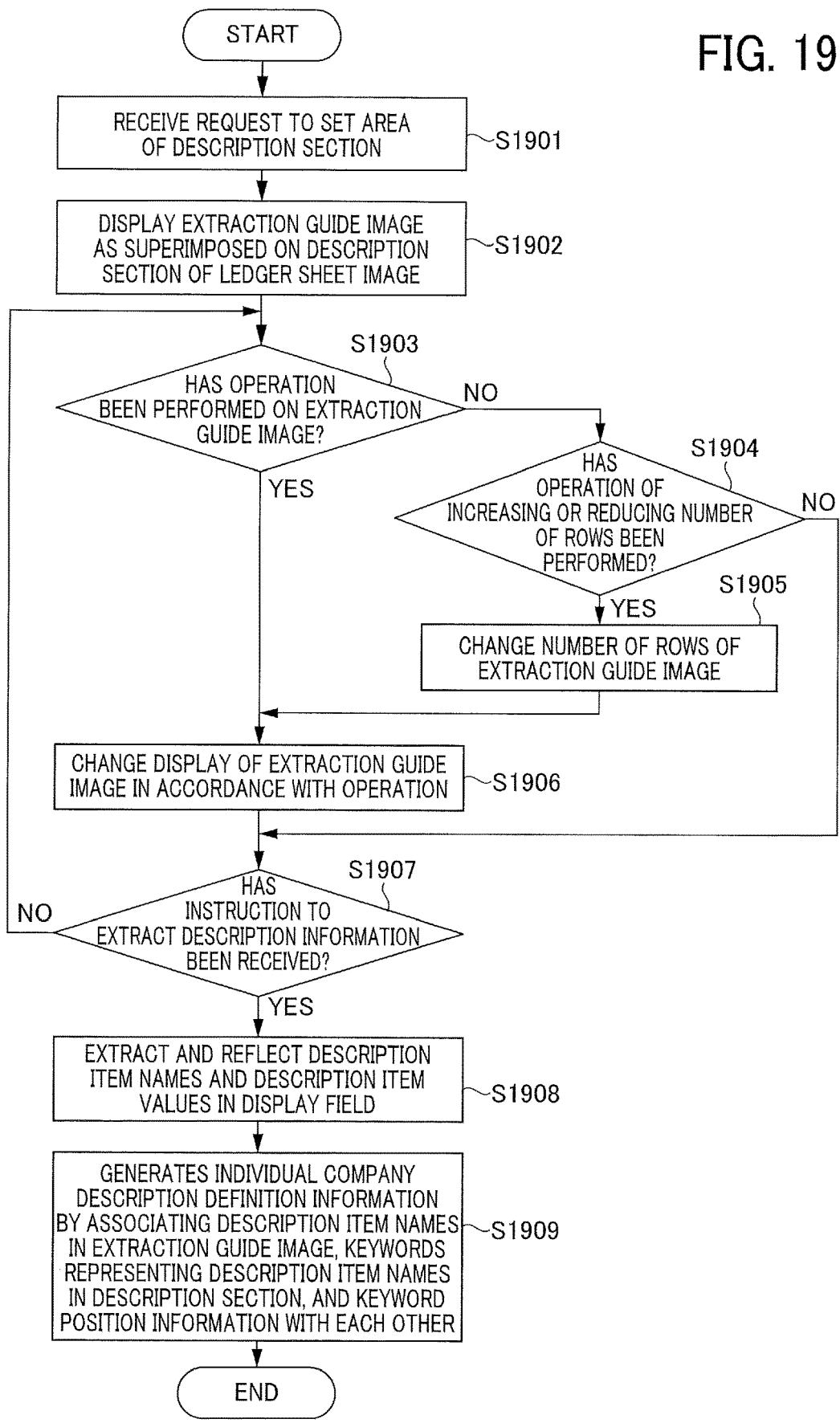
FIG. 19 is a flowchart illustrating another example of the process of the definition registering unit of the embodiment.

FIG. 19 is a flowchart illustrating a process of the definition registering unit 290. FIG. 19 illustrates details of the process of step S1806 in FIG. 18.

In the definition registering unit 290 of the embodiment, the operation receiving unit 291 receives an operation of requesting to set the area of the description section on the recognition result check screen displayed on the terminal apparatus 400 (step S1901).

Then, in the definition registering unit 290, the display control unit 292 causes the terminal apparatus 400 to display the extraction guide image to be superimposed on the description section of the ledger sheet image on the recognition result check screen (step S1902). Details of the extraction guide image will be described later.

Then, in the definition registering unit 290, the operation receiving unit 291 determines whether an operation has been performed on the extraction guide image displayed on the recognition result check screen of the terminal apparatus 400 (step S1903). If it is determined at step S1903 that an operation has been performed on the extraction guide image (YES at step S1903), the definition registering unit 290 proceeds to the process of step S1906, which will be described later.

If it is determined at step S1903 that no operation has been performed on the extraction guide image (NO at step S1903), the display control unit 292 of the definition registering unit 290 determines whether an operation has been performed on a display component on the recognition result check screen to instruct to increase or reduce the number of rows in the extraction guide image (step S1904). The display component for instructing to increase or reduce the number of rows in the extraction guide image is displayed on the recognition result check screen together with the extraction guide image. Details of the display component will be described later.

If it is determined at step S1904 that the operation of instructing to increase or reduce the number of rows in the extraction guide image has not been performed (NO at step S1904), the definition registering unit 290 proceeds to the process of step S1907, which will be described later.

If it is determined at step S1904 that the operation of instructing to increase or reduce the number of rows in the extraction guide image has been performed (YES at step S1904), the display control unit 292 of the definition registering unit 290 changes the number of rows in the extraction guide image in accordance with the operation (step S1905).

Then, in the definition registering unit 290, the display control unit 292 changes the display of the extraction guide image in accordance with the operation received at step S1903 (step S1906).

Then, in the definition registering unit 290, the operation receiving unit 291 determines whether an instruction to extract the description information has been received (step S1907). If it is determined at step S1907 that the instruction to extract the description information has not been received (NO at step S1907), the definition registering unit 290 returns to the process of step S1903.

If it is determined at step S1907 that the instruction to extract the description information has been received (YES at step S1907), the item extracting unit 277 of the ledger sheet recognizing unit 270 extracts the description item names and the values of the description items in the area represented by the extraction guide image, and reflects the description item names and the values of the description items in a description information display field on the recognition result check screen (step S1908).

Then, in the definition registering unit 290, the definition generating unit 293 generates the individual company description definition information 251 (step S1909). Then, the server 200 completes the process of FIG. 19. Specifically, the definition generating unit 293 generates the individual company description definition information 251 by associating the description item names represented by the extraction guide image, the keywords extracted from the description section of the ledger sheet image as the description items, and the information representing the positions of the keywords in the ledger sheet with each other.

A display example of the recognition result check screen will be described with reference to FIGS. 20 to 26.

Figure 20:
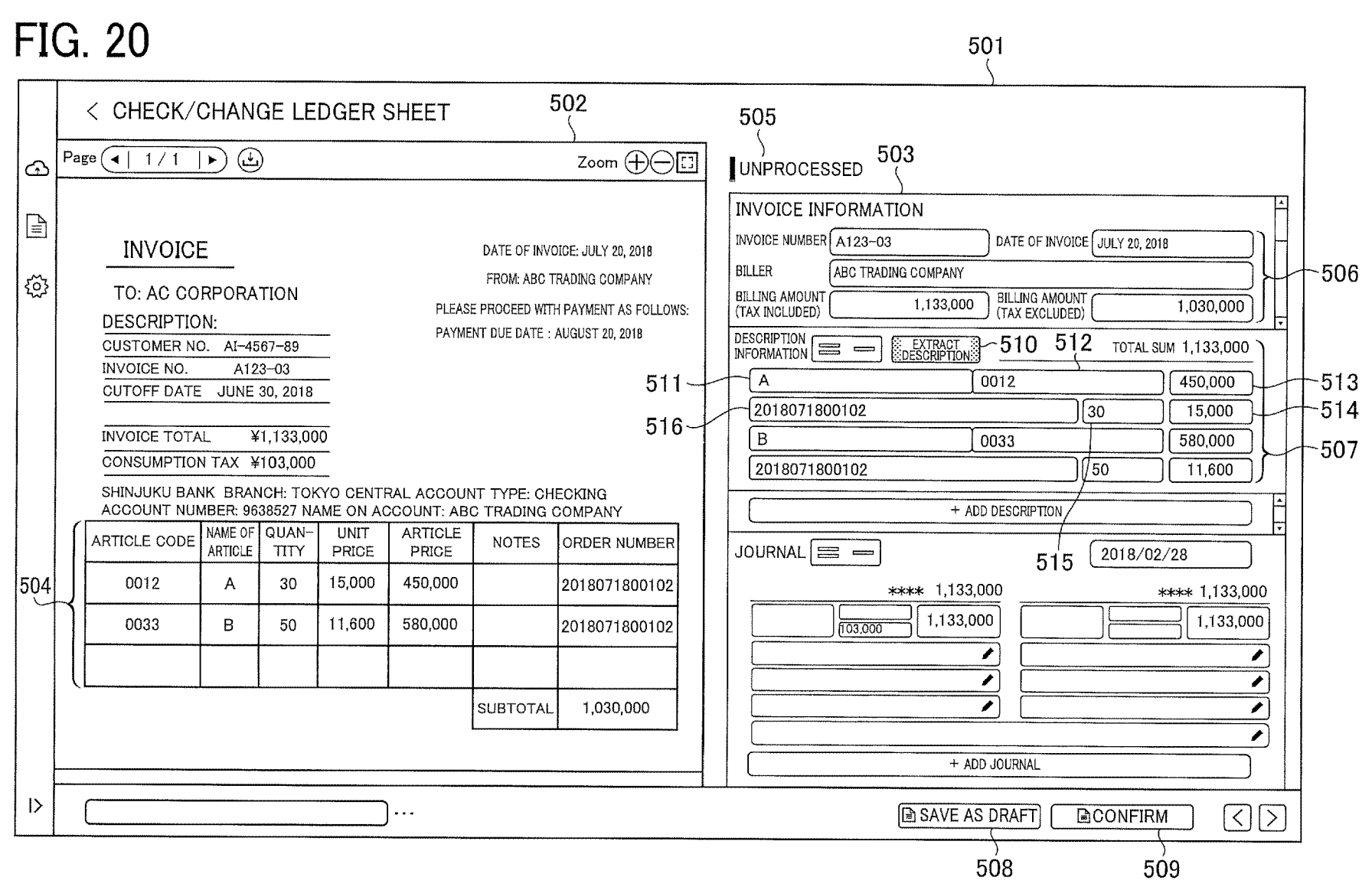

FIG. 20 is a diagram illustrating a display example of the recognition result check screen. A screen 501 illustrated in FIG. 20 is an example of the recognition result check screen displayed on the terminal apparatus 400 at step S1124 in FIG. 11B, for example.

The screen 501 includes display fields 502 and 503 and display components 508 and 509. The display field 502 displays the ledger sheet image represented by the ledger sheet image data. In the example of FIG. 20, the ledger sheet is an invoice, and the display field 502 includes an area 504 representing the description section of the ledger sheet image.

As illustrated in FIG. 20, the description section of the ledger sheet image is expressed in table format. That is, the description section of the ledger sheet image is an example of a tabular image.

The display field 503 displays the recognition result data resulting from the ledger sheet recognition performed by the ledger sheet recognizing unit 270 on the ledger sheet image data representing the ledger sheet image displayed in the display field 502.

The display field 503 includes display fields 505, 506, and 507. The display field 505 displays the value of the information item "status" in the job list 101 (see FIG. 12). The display field 506 displays the biller information. The biller information is part of the recognition result data.

The display field 507 displays the description information. Specifically, the display field 507 displays a list of values of the description items included in the description information. The display field 507 includes display fields 511, 512, 513, 514, 515, and 516 and a display component 510.

The display component 510 is used to instruct to display the extraction guide image. That is, the display component 510 is used to notify the server 200 of an instruction to set the areas of the item names and item values to be extracted from the tabular image.

The display field 511 displays the value of the description item corresponding to the description item name "name of article" displayed in the area 504 representing the description section of the ledger sheet image. The display field 512 displays the value of the description item corresponding to the description item name "article code" displayed in the area 504. The display field 513 displays the value of the description item corresponding to the description item name "article price" displayed in the area 504.

The display field 514 displays the value of the description item corresponding to the description item name "unit price" displayed in the area 504. The display field 515 displays the value of the description item corresponding to the description item name "quantity" displayed in the area 504. The display field 516 displays the value of the description item corresponding to the description item name "order number" displayed in the area 504.

In the embodiment, the item values are thus extracted for the description items corresponding to the description item names in the description section of the ledger sheet image, and are displayed in the display fields 511 to 516. That is, the description items corresponding to the description item names are extraction target items to be extracted. The extraction target items may be fixed, or may be changed by the user.

FIG. 20 illustrates an example in which the recognition result data has been successfully extracted from the ledger sheet image data. In this example, therefore, the values corresponding to all description item names in the description section displayed in the area 504 are displayed in the display field 507.

The display component 508 is used to change the value of the information item "status" in the job list 101 to "saved as draft" from "unprocessed." When the display component 508 is operated, the value in the display field 505 is changed to "saved as draft" from "unprocessed."

The display component 509 is used to set the value of the information item "status" in the job list 101 to "confirmed." In the example of FIG. 20, the recognition result data has been successfully extracted from the ledger sheet image data, and thus the recognition result data is not corrected. In the example of FIG. 20, therefore, when the display component 509 is operated, the value of the information item "status" in the job list 101 is changed to "confirmed," and the generation of the individual company description definition information 251 does not take place.

The ledger sheet recognizing unit 270 of the embodiment may hold correction history information indicating that the recognition result data has been corrected on the recognition result check screen and operation history information indicating that the display component 510 has been operated. Further, if none of the correction history information and the operation history information is held in the ledger sheet recognizing unit 270 when the display component 509 is operated, the ledger sheet recognizing unit 270 may set the value of the information item "status" in the job list 101 to "confirmed."

Figure 21:
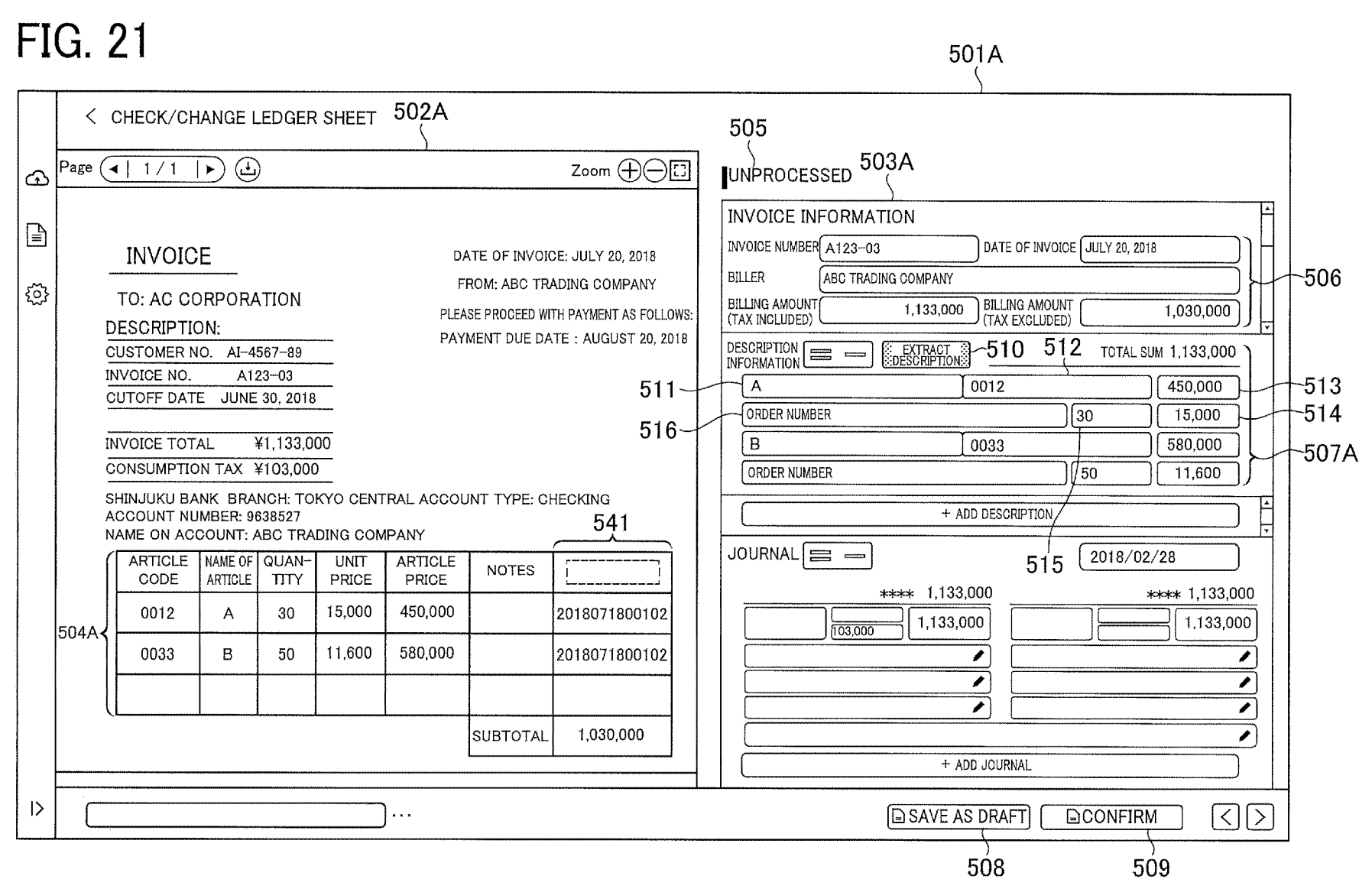

FIG. 21 is a diagram illustrating another display example of the recognition result check screen. A screen 501A illustrated in FIG. 21 includes display fields 502A and 503A and the display components 508 and 509.

The display field 502A displays the ledger sheet image represented by the ledger sheet image data. The display field 502A includes an area 504A representing the description section (i.e., the tabular image) of the ledger sheet image. In the description section represented by the area 504A, there is no description item name in a column 541. Therefore, the description information displayed in a display field 507A of the display field 503A does not display the value of the description item corresponding to the column 541 of the description section.

Further, even if a character string representing a description item name other than "order number," such as a character string representing a description item name "order ID," for example, is described in the column 541 of the description section, the described character string is not recognized as representing the description item name "order number." In this case, therefore, the values of the description item corresponding to the column 541 of the description section are not displayed.

Specifically, the display field 516 in the display field 507A is left blank. In the embodiment, when the display field 516 is left blank, a generic description item name may be displayed in the display field 516 as a hint for helping the user to input data to the display field 516. In the example of FIG. 21, the description item name "order number" is displayed in the display field 516 as such a hint.

Figure 22:
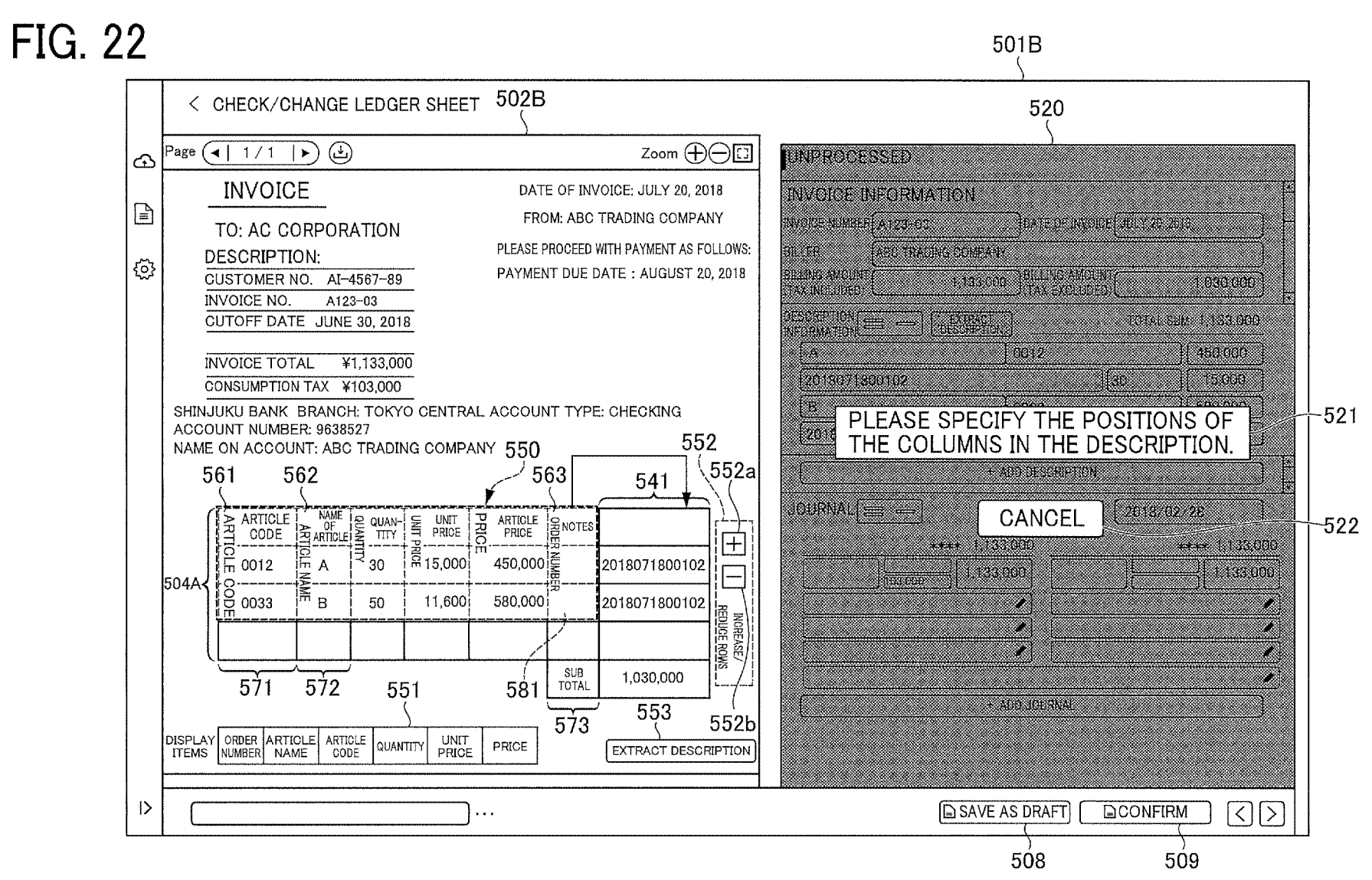

When the display component 510 is operated in the display field 507A, the screen 501A transitions to a screen 501B illustrated in FIG. 22.

FIG. 22 is a diagram illustrating another display example of the recognition result check screen. The screen 501B illustrated in FIG. 22 includes display fields 502B and 520 and the display components 508 and 509.

The display field 520 displays a message 521 and a display component 522. The message 521 is for prompting the user to specify the extraction area in the description section, i.e., the columns in which the description item names and the values of the description items are associated with each other. The display component 522 is used to cancel the operation of specifying the extraction area. When the display component 522 is operated in the display field 520, the screen 501B transitions back to the screen 501A.

With the display component 510 operated on the screen 501A, the display field 502B displays an extraction guide image 550, a display field 551, and display components 552 and 553.

With the extraction guide image 550, a list of description item names associated with the area represented by the extraction guide image 550 is displayed in the display field 551. That is, a list of extraction target items is displayed. These extraction target items correspond to the values of the description items displayed in the display fields 511 to 516 in the display field 507 in FIG. 20. The display component 552 is used to perform the operation of increasing or reducing the number of rows in the extraction guide image 550.

The display component 553 is used to reflect, in the display field 507, the values of the description items represented by the description item names associated with the area represented by the extraction guide image 550.

That is, the display component 553 is used to instruct to extract, from the image of the description section, the item names and the item values in the extraction area represented by the extraction guide image 550 and associate the item names and the item values with each other. It is assumed in the present example that the item extracting unit 277 has received the instruction to extract the item names and the item values in response to receipt of the operation of the display component 553 in the terminal apparatus 400.

In response to receipt of the instruction to extract the item names and the item values, the item extracting unit 277 extracts, from the tabular image representing the description section, the keywords in the areas of the item names, i.e., the description item names, in the extraction area (examples of a first keyword) and the keywords in the areas of the item values, i.e., the values of the description items, in the extraction area (examples of a second keyword).

The example of FIG. 22 indicates that, with the extraction guide image 550, "order number," "article name," "article code," "quantity," "unit price," and "price" are previously determined as the description item names associated with the area represented by the extraction guide image 550. These description item names are previously determined item names typically used in the description section of the ledger sheet such as the invoice, the statement of delivery, or the purchase slip, for example.

In the example of FIG. 22, the extraction guide image 550 includes the image of a rectangle substantially the same in size as the image of the description section represented by the area 504A. The extraction guide image 550 also includes, in the image of the rectangle, the images of lines positioned to be superimposed on ruled lines of the description section. That is, the extraction guide image 550 is an image superimposed on the outer frame and the ruled lines of the tabular image representing the description section. In other words, the extraction guide image 550 is an image including rectangles enclosing the columns in the description section.

The area represented by the image enclosing one of the columns in the extraction guide image 550 is associated with the description item name represented by the character image displayed in the area. The character image representing the description item name is displayed as part of the extraction guide image 550.

When displaying the character image, the display control unit 292 of the embodiment causes the terminal apparatus 400 to display the character image at the position corresponding to that of the description item name in the description section represented by the area 504A with reference to the recognition result obtained with the general-purpose description definition information 253.

Specifically, a character image 561, which represents "article code," is displayed at the position corresponding to that of a column 571 of the description item name "article code" in the description section of the area 504A. With the extraction guide image 550, therefore, the area of the column 571 in the image of the description section is associated with the description item name "article code."

Similarly, a character image 562, which represents "article name," is displayed at the position corresponding to that of a column 572 of the description item name "name of article" in the description section of the area 504A. With the extraction guide image 550, therefore, the area of the column 572 in the image of the description section is associated with the description item name "article name.". The keywords displayed in the cells in the second and subsequent rows in the column 572 represent the values of the description item "name of article."

Further, a character image 563, which represents "order number," is displayed at the position corresponding to that of a column 573 of a description item name "notes" in the description section of the area 504A. In this state, the area of the column 573 is associated with the description item name "order number."

In the embodiment, in response to receipt of an operation of moving a rectangular image 581, which is superimposed on the column 573 in the extraction guide image 550, to the position superimposed on the area of the column 541 in the description section in this state, the area of the column 541 is associated with the description item name "order number." In this case, the character image 563 displayed in the rectangular image 581 moves together with the rectangular image 581.

Further, in the embodiment, in response to receipt of an operation of a display component 552a of the display component 552, the number of rows in the extraction guide image 550 is increased. In the embodiment, it is preferable to operate the display component 552a to make the number of rows in the extraction guide image 550 equal to the number of rows in the description section in the area 504A. If a display component 552b of the display component 552 is operated, the number of rows in the extraction guide image 550 is reduced.

Figure 23:
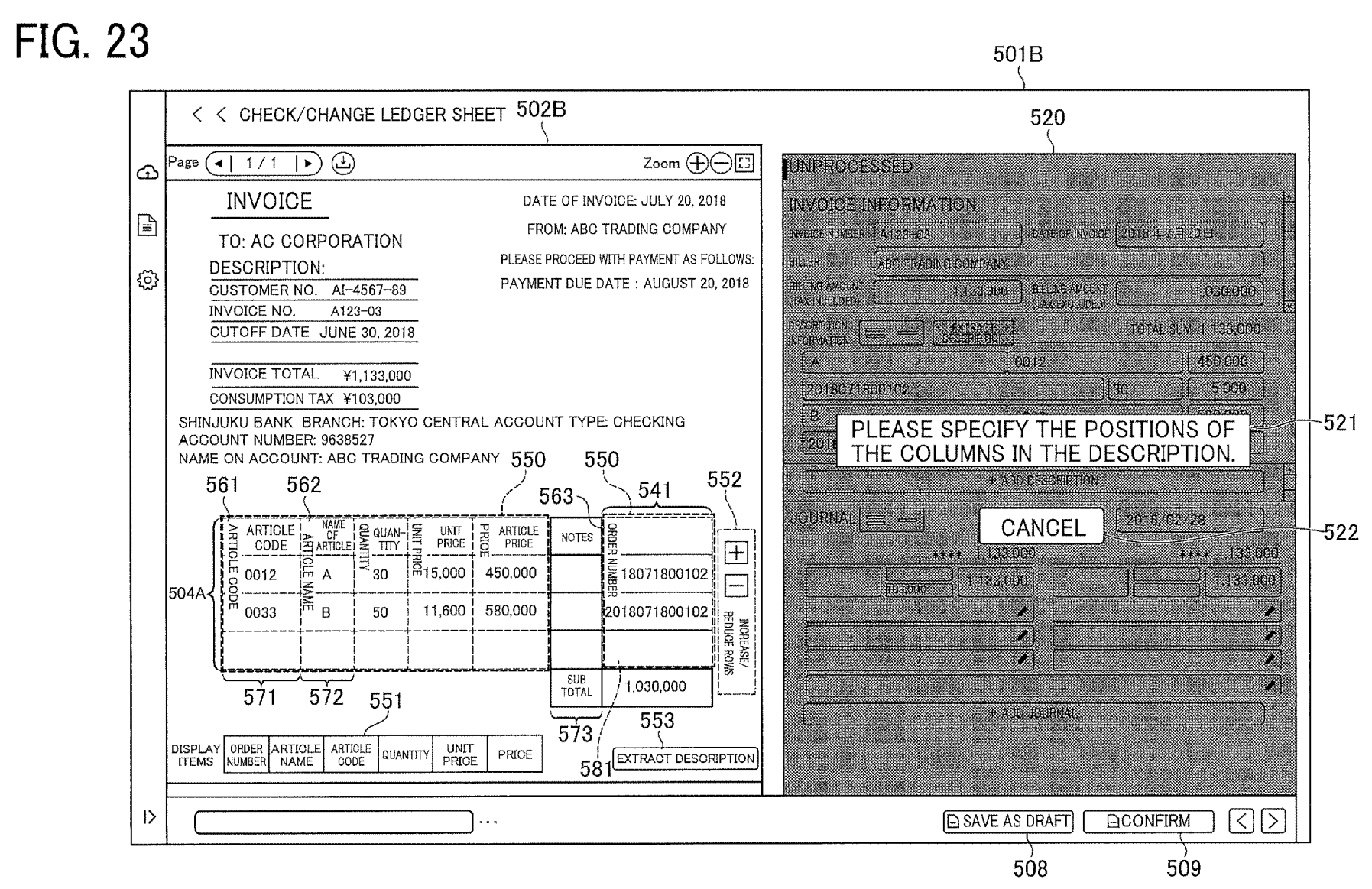

FIG. 23 is a diagram illustrating another display example of the recognition result check screen. In the display field 502B on the screen 501B illustrated in FIG. 23, the rectangular image 581 and the character image 563 are displayed at the position superimposed on the area of the column 541.

In the embodiment, with the above-described operation, the area of the column 541 in the description section is associated with the description item name "order number" in the extraction guide image 550. That is, the keywords displayed in the second and subsequent rows in the column 541 of the description section represent the values of the description item "order number."

As described above, in the embodiment, the extraction guide image 550 is displayed in which the areas of the predetermined certain description item names are associated with the areas of the description item values in accordance with the rows and columns of the tabular image of the description section included in the ledger sheet image.

Further, in the embodiment, in response to receipt of the operation of moving a rectangular image included in the extraction guide image 550 and associated with a certain description item name, the rectangular image is moved. Then, in the image of the description section, an area with the rectangular image superimposed thereon displays the certain description item name associated with the rectangular image and the value of the description item.

In the embodiment, when the display component 553 is operated in the state of FIG. 23, the keywords displayed in the second and subsequent rows in the column 541 of the description section are extracted as the values of the description item "order number" and reflected in the display field 516 (see FIG. 21).

Then, in the definition registering unit 290, the definition generating unit 293 generates the individual company description definition information 251. Specifically, the definition generating unit 293 acquires, from the ledger sheet image, the information representing the positions of the uppermost cells of the columns in the extraction guide image 550 and the description item names associated with the columns by the extraction guide image 550. The information representing the positions of the uppermost cells may be cell coordinates, for example.

The definition generating unit 293 then associates the acquired description item names and the acquired cell coordinates with each other as the values of the information item "description item name" of the individual company description definition information 251 and the values of the information item "extracted information" of the individual company description definition information 251, respectively.

If the description item name associated with the area of a column of the description section by the extraction guide image 550 is different from the description item name displayed in the description section, the definition generating unit 293 determines the description item name in the description section as the keyword of the information item "extracted information" of the individual company description definition information 251.

In the column 571 in the example of FIG. 23, for example, the description item name in the description section and the description item name associated with the area of the column 571 by the extraction guide image 550 are both "article code." The definition generating unit 293 therefore sets the value of the information item "description item name" of the individual company description definition information 251 as "article code," and sets the value of the information item "extracted information" as the cell coordinates of the uppermost cell in the column 571 of the ledger sheet image.

The definition generating unit 293 may include the keyword "article code" in the value of the information item "extracted information."

Further, in the column 572, the description item name associated with the area of the column 572 by the extraction guide image 550 is "article name," and the description item name in the description section is "name of article." The definition generating unit 293 therefore sets the value of the information item "description item name" of the individual company description definition information 251 as "article name," and sets the value of the information item "extracted information" as the cell coordinates of the uppermost cell in the column 572 and the keyword "name of article" displayed in the column 572 of the description section.

Further, in the column 573, the description item name associated with the area of the column 573 by the extraction guide image 550 is "order number," and there is no corresponding description item name in the description section. The definition generating unit 293 therefore sets the value of the information item "description item name" of the individual company description definition information 251 as "order number," and sets the value of the information item "extracted information" as the cell coordinates of the uppermost cell in the column 541.

The definition generating unit 293 thus generates the individual company description definition information 251 corresponding to the columns included in the extraction guide image 550.

As described above, in the embodiment, in response to receipt of the operation of setting the position of the extraction guide image 550 in the tabular image, the area in the tabular image with the extraction guide image 550 superimposed thereon is set as the extraction area from which the item names and the item values associated with each other by the extraction guide image 550 are extracted.

That is, in the embodiment, the extraction guide image 550 is displayed which includes the rectangular images enclosing the respective columns in the description section expressed in table format. Then, the rectangular images are moved to associate the description item names previously associated with the columns in the extraction guide image 550 with the areas of the columns in the description section.

According to the embodiment, therefore, when setting, in the image of the description section expressed in table format, the extraction area for extracting the description item names and the values of the description items, it is unnecessary to adjust the spacing of the columns, for example. Further, according to the embodiment, the extraction guide image 550 includes the plurality of rectangular images associated with the certain description item name, thereby enabling the extraction area corresponding to the plurality of description item names to be set on a single screen.

As described above, according to the embodiment, the extraction area of the item names and the item values is set in the tabular image with a simple operation.

When the display component 509 is operated, the screen 501B of FIG. 23 transitions to a screen 501C illustrated in FIG. 24.

FIG. 24 is a diagram illustrating another display example of the recognition result check screen. On the screen 501C illustrated in FIG. 24, the display field 520 displays a display field 523, which displays an input field 524 and a display component 525.

The input field 524 is used to input the biller information. The display component 525 is used to instruct to store, in the description definition DB 250, the individual company description definition information 251 generated based on the extraction area set with the extraction guide image 550.

In the embodiment, when the display component 525 is operated, the individual company description definition information 251 generated by the definition generating unit 293 is stored in the description definition DB 250.

FIG. 25 is a diagram illustrating another display example of the recognition result check screen. A screen 501D illustrated in FIG. 25 includes display fields 502C and 503B and the display components 508 and 509.

The display field 502C displays the ledger sheet image. An area 504B in the ledger sheet image represents the image of the description section. The description section represented by the area 504B does not include a column in which the description item name "unit price" and the value of the description item "unit price" are associated with each other.

In a display field 507B of the display field 503B, therefore, the display field 514 for displaying the value of the description item corresponding to the description item name "unit price" is blank.

Figure 26:
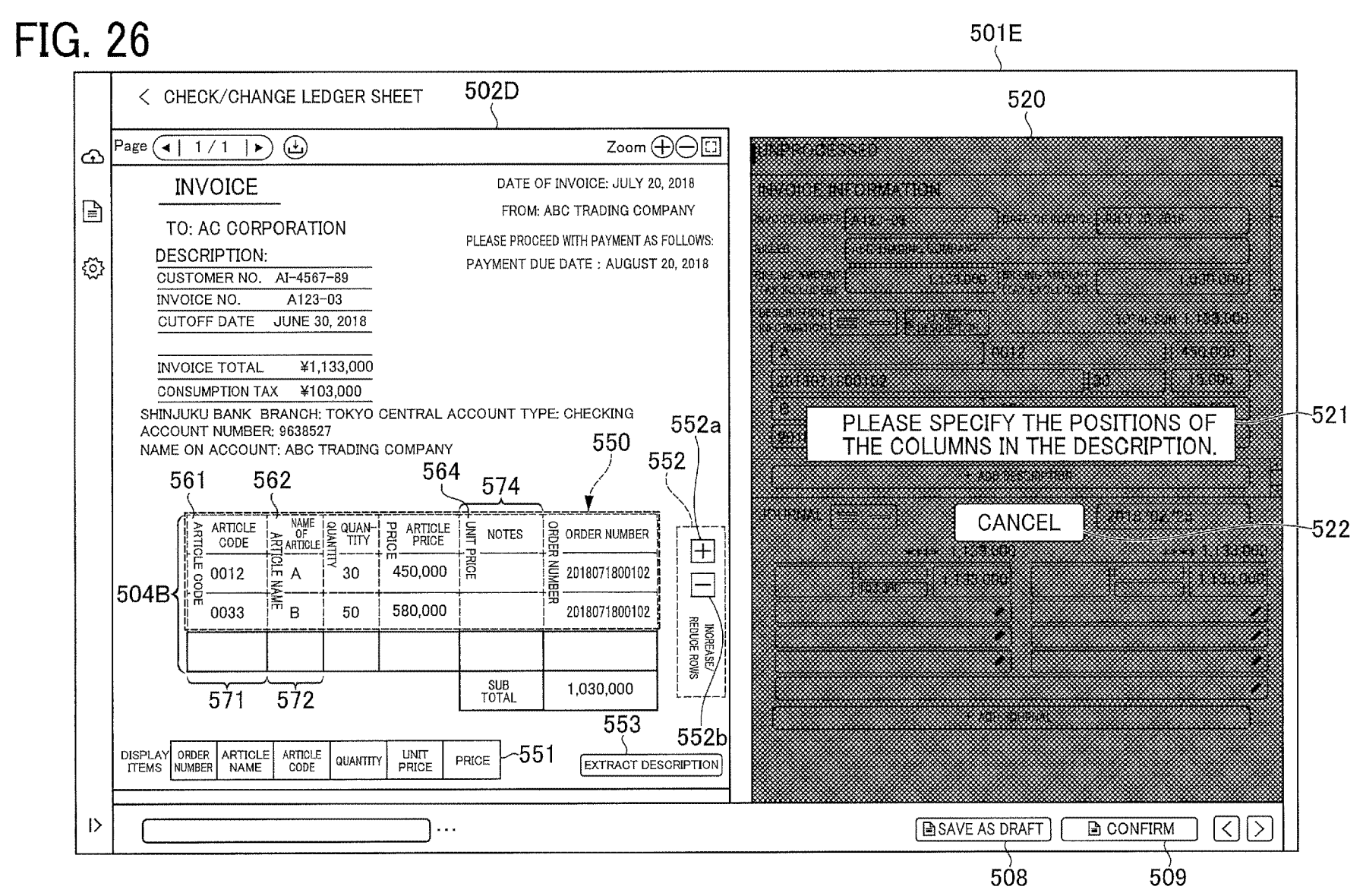

When the display component 510 is operated in the display field 507B, the screen 501D transitions to a screen 501E illustrated in FIG. 26.

FIG. 26 is a diagram illustrating another display example of the recognition result check screen. The screen 501E illustrated in FIG. 26 includes a display field 502D, the display field 520, and the display components 508 and 509.

In the display field 502D, the extraction guide image 550 is displayed as superimposed on the image of the description section represented by the area 504B. The display field 502D further displays the display field 551 and the display components 552 and 553.

In this case, the extraction guide image 550 includes the columns corresponding to all description item names displayed in the display field 551. In the image of the description section, therefore, a rectangular image in the extraction guide image 550 associated with the description item name "unit price" and a character image 564 representing "unit price" are displayed as superimposed on a column 574 displaying the description item name "notes."

In the embodiment, if a description item name not existent in the description section is selected in this case from the list of description item names displayed in the display field 551, the image representing the area associated with the nonexistent description item name is deleted from the extraction guide image 550.

Figure 27:
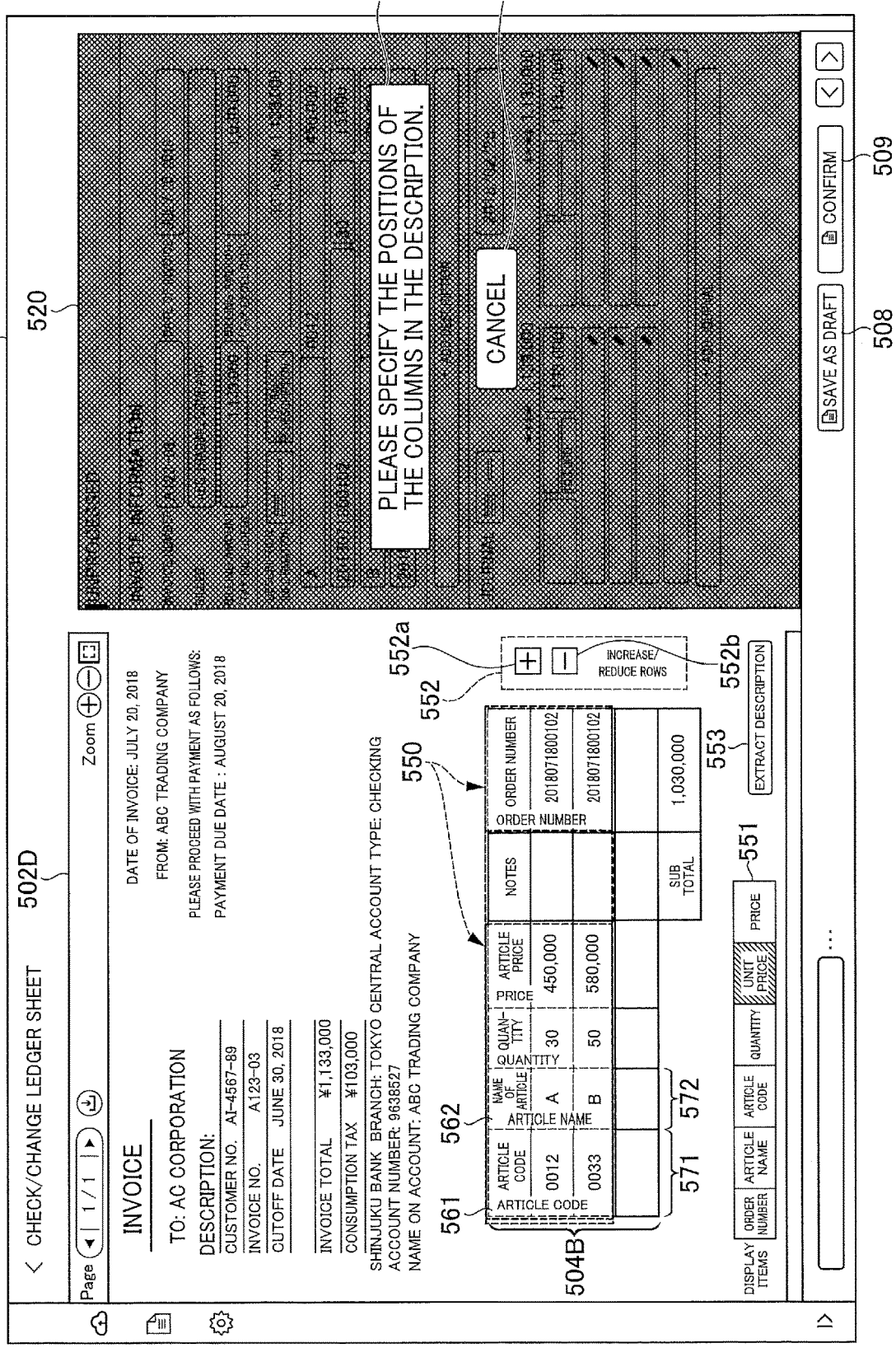

FIG. 27 is a diagram illustrating another display example of the recognition result check screen. A screen 501F illustrated in FIG. 27 is an example of the screen displayed in response to receipt of an operation of selecting the description item name "unit price" from the display field 551 on the screen 501E.

In the display field 502D of the embodiment, in response to receipt of the above-described operation, the description item name "unit price" in the display field 551 is displayed differently from the remaining description item names in the display field 551. Specifically, in the embodiment, the description item name "unit price" selected from the display field 551 may be displayed as grayed out.

Further, on the screen 501F, the rectangular image superimposed on the column 574 in the image of the description section and the character image 564 representing "unit price" (see FIG. 26) are deleted from the extraction guide image 550. If the operation of selecting the description item name "unit price" from the display field 551 is received again, the once-deleted images, i.e., the rectangular image superimposed on the column 574 in the image of the description section and the character image 564 representing "unit price" are displayed again. With this operation of the display field 551, the user is able to specify the areas of description item names to be displayed in the extraction guide image 550. That is, the number of areas to be displayed in the extraction guide image 550 based on the extraction target items is increased or reduced in accordance with the user operation.

As described above, in the embodiment, if one of the description item names previously associated with the extraction guide image 550 is deleted, the rectangular image representing the area associated with the description item name (i.e., the extraction area of the extraction target item associated with the description item name) is deleted. In the embodiment, therefore, the number of rectangular images to be included in the extraction guide image 550 is adjustable based on the description item names included in the description section or the number of the description item names included in the description section.

Further, if the display component 553 is operated when one of the description item names is deleted, the definition registering unit 290 may generate the individual company description definition information 251 by including therein information indicating that the description item name (i.e., the extraction target item) has been deleted. When displaying the extraction guide image 550 on the image of another ledger sheet created by the same issuer, therefore, it is possible to identify the deleted description item name with reference to the individual company description definition information 251, and display the extraction guide image 550, from which the rectangular image representing the area corresponding to the description item name is deleted.

With reference to FIGS. 28A and 28B, a description will be given of another example of the operation performed on the extraction guide image 550.

FIGS. 28A and 28B are diagrams illustrating another display example of the recognition result check screen. FIG. 28A illustrates an example in which the extraction guide image 550 is displayed as superimposed on the description section of the ledger sheet image displayed on the recognition result check screen.

In the image of the description section in FIG. 28A, the description item name "name of article" is displayed in the uppermost cell of a column 575, and the cells under the uppermost cell of the column 575 are blank. Further, in the image of the description section, the uppermost cell of a column 576 is blank, and values "A" and "B" are displayed in two cells under the uppermost cell of the column 576.

The image of a column 582 associated with the description item name "article name" in the extraction guide image 550 is displayed as superimposed on the column 575 in the image of the description section.

FIG. 28B is a diagram illustrating an operation performed on the extraction guide image 550 displayed as illustrated in FIG. 28A.

In the description section illustrated in FIGS. 28A and 28B, the description item name "name of article" displayed in the uppermost cell of the column 575 is in fact associated with the values displayed in the second uppermost cell and the subsequent cells of the column 576. In the embodiment, an operation of increasing the width of the column 582 in the extraction guide image 550 is received in this case.

In FIG. 28B, the image of a column 582a, which is obtained by increasing the width of the column 582 in the extraction guide image 550, is displayed as superimposed on the columns 575 and 576 in the image of the description section.

With this operation, the area of the columns 575 and 576, on which the image of the column 582a in the extraction guide image 550 is superimposed, is set as the extraction area in the image of the description section in FIG. 28B, i.e., the extraction area from which the description item name "name of article" and the values of the description item "name of article" are extracted.

In the above-described embodiment, the description section of the ledger sheet image is in the format of a table with ruled lines. However, the description section is not limited thereto. For example, the columns in the description section may be displayed in different background colors from each other. In this case, the display control unit 292 may detect an area with a certain background color as one column.

Further, in the above-described embodiment, the extraction guide image 550 is displayed to be superimposed on the columns of the description section including the item names and the item values. However, the display of the extraction guide image 550 is not limited thereto. For example, the extraction guide image 550 may be displayed to be superimposed on the areas of the item values but not on the areas of the item names in the columns of the description section. That is, the user may set the extraction area of the item values with the extraction guide image 550, and may identify the extraction area of the item names based on the set extraction area of the item values.

Further, in the above-described embodiment, the tabular image on which the extraction guide image 550 is displayed is the image of the description section in the ledger sheet image. The tabular image on which the extraction guide image 550 is displayed, however, is not limited thereto. In the embodiment, the tabular image on which the extraction guide image 550 is displayed may be any tabular image other than the ledger sheet image, if the plurality of item names used in the tabular image are previously inferable. Specifically, the tabular image on which the extraction guide image 550 is displayed may be the image of a school report or a curriculum vitae, for example.

The apparatuses described in the embodiment form one of a plurality of computing environments for implementing the embodiment disclosed in the present specification.

In an embodiment of the present invention, the server 200 is a server cluster including a plurality of computing devices. The plurality of computing devices are configured to communicate with each other via a desired type of communication link such as a network or a shared memory, for example, to execute the processes disclosed in the present specification. Similarly, the server 200 may include a plurality of computing devices configured to communicate with each other.

Further, the server 200 may be configured with various combinations of the disclosed process steps. For example, a process executed by the server 200 may be executed by another server. Similarly, the function of the server 200 may be executed by another server. Further, the components of the server 200 and another server may be included in a single server, or may be distributed to a plurality of apparatuses.

The databases described in the present specification may be generated as a result of machine learning. Further, if the keywords that may be included in the description of transaction details and the items of account are categorized by machine learning, it is unnecessary to use the correspondence tables.

Herein, machine learning refers to a technology for causing a computer to acquire learning ability similar to human learning ability. According to the technology, the computer autonomously generates, from previously learned data, algorithms for making decisions such as data identification, and makes predictions by applying the algorithms to new data. The learning method for machine learning may be any of supervised learning, unsupervised learning, semi-supervised learning, reinforcement learning, and deep learning, or may be a combination of two or more of these learning methods. The learning method for machine learning is not limited to a particular method.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An information processing system comprising circuitry configured to cause a terminal apparatus to display a setting screen for setting an extraction area for extracting, from a tabular image, an item value for each of one or more extraction target items, the setting, screen displaying, on the tabular image, an extraction guide representing, the extraction area according to each of the one or more extraction target items, the setting screen further displaying, simultaneously, a first display component to perform an operation of increasing number of rows included in the extraction guide and a second display component to perform an operation of decreasing the number of the rows included in the extraction guide, and receive an operation of setting a position of the extraction guide on the setting screen by receiving an operation of one of the first display component or the second display component, wherein the circuitry generates a plurality of types of description definition information including individual company description information and business type description definition information, each of the plurality of types of the description definition information having a different level of priority for extracting among the plurality of types of the description definition information and including information representing a position of an area of a description item name in the tabular image, said information being associated with a keyword in the area of the description item name, and stores the plurality of types of description definition information in a memory, wherein the circuitry further specifies a type of business that generates a ledger sheet from which the tabular image is generated, extracts the extraction target items based on the individual company description information, and extracts the extraction target items based on business type description definition information that is associated with a specified type of the business upon determining that no extraction target item is extracted based on the individual company description information.

2. The information processing system of claim 1, wherein the circuitry receives an operation of specifying an extraction target item out of the one or more extraction target items on the setting screen, and causes the terminal apparatus to display the extraction guide representing the extraction area according to the specified extraction target item.

3. The information processing system of claim 1, wherein the circuitry causes the terminal apparatus to display the extraction guide representing the extraction area to extract an item name and the item value for each of the one or more extraction target items, the extraction area including an area of the item name and an area of the item value associated with each other for each of the one or more extraction target items.

4. The information processing system of claim 3, wherein the tabular image is an image of a description section of a ledger sheet image that is generated from the ledger sheet, and wherein the item name corresponds to the description item name included in the description section, and the item value corresponds to a value of a description item represented by the description item name.

5. The information processing system of claim 4, wherein in response to receipt of an instruction to extract the description item name and the value of the description item from the description section, the circuitry extracts, from the image of the description section, a first keyword in an area of the description item name in the extraction area and a second keyword in an area of the value of the description item in the extraction area, and associates the first keyword and the second keyword with each other.

6. The information processing system of claim 5, wherein the circuitry extracts the description item name and the value of the description item from the description section by using on the plurality of types of description definition information in order based on to different levels of priority.

7. The information processing, system of claim 3, wherein the circuitry receives an operation of moving, on the tabular image, a position of a column included in the extraction guide and associating the item name and the item value with each other.

8. The information processing system of claim 3, wherein the extraction guide includes a plurality of columns each associating the item name and the item value with each other, and
wherein the circuitry causes the terminal apparatus to display the extraction guide with each of the plurality of columns in the extraction guide matching in width a corresponding one of a plurality of columns in a table represented by the tabular image.

9. The information processing system of claim 8, wherein the circuitry causes the terminal apparatus to further display a display component and a list of item names, the display component being used to perform an operation of changing number of rows included in the extraction guide.

10. The information processing system of claim 1 comprising:
a server including the circuitry; and
the terminal apparatus including a display,
wherein the circuitry of the server
transmits, to the terminal apparatus, an instruction to display the setting screen, and receives, from the terminal apparatus, information representing an operation performed on the setting, screen, and
wherein the terminal apparatus displays the setting screen on the display in accordance with the instruction received from the server.

11. An information processing method comprising:
displaying, on a display, a setting screen for setting an extraction area for extracting, from a tabular image, an item value for each of one or more extraction target items, the setting, screen displaying, on the tabular image, an extraction guide representing the extraction area according to each of the one or more extraction target items, the setting screen further displaying, simultaneously, a first display component to perform an operation of increasing number of rows included in the extraction guide and a second display component to perform an operation, of decreasing the number of the rows included in the extraction guide;
receiving an operation of setting a position of the extraction guide on the setting screen by receiving an operation of one of the first display component or the second display component;
generating a plurality of types of description definition information including individual company description information and business type description definition information, each of the plurality of types of the description definition information having a different level of priority for extracting among the plurality of types of the description definition information and including information representing a position of an area of a description item name in the tabular image, said information being associated with a keyword in the area of the description item name; and
storing the plurality of types of description definition information in a memory, wherein the information processing method further comprises:
specifying a type of business that generates a ledger sheet from which the tabular image is generated,
extracting the extraction target items based on the individual company description information, and
extracting the extraction target items based on business type description definition information that is associated with a specified type of the business upon determining that no extraction target item is extracted based on the individual company description information.

12. The information processing method of claim 11, further comprising:
receiving an operation of specifying an extraction target item out of the one or more extraction target items on the setting screen,
wherein the displaying includes
displaying the extraction guide representing the extraction area according to the specified extraction target item.

13. The information processing method of claim 11, wherein the displaying includes
displaying the extraction guide representing the extraction area to extract an item name and the item value for each of the one or more extraction target items, the extraction area including an area of the item name and an area of the item value associated with each other for each of the one or more extraction target items.

14. The information processing method of claim 13, wherein the tabular image is an image of a description section of a ledger sheet image, and
wherein the item name corresponds to the description item name included in the description section, and the item value corresponds to a value of a description item represented by the description item name.

15. The information processing method of claim 14, further comprising:
in response to receipt of an instruction to extract the description item name and the value of the description item from the description section, extracting, from the image of the description section, a first keyword in an area of the description item name in the extraction area and a second keyword in an area of the value of the description item in the extraction area; and
associating the first keyword and the second keyword with each other.

16. The information processing method of claim 13, further comprising:
receiving an operation of moving, on the tabular image, a position of a column included in the extraction guide and associating the item name and the item value with each other.

17. The information processing method of claim 13, wherein the extraction guide includes a plurality of columns each associating the item name and the item value with each other, and
wherein the displaying includes
displaying the extraction guide with each of the plurality of columns in the extraction guide matching in width a corresponding one of a plurality of columns in a table represented by the tabular image.

18. The information processing method of claim 17, wherein the displaying includes displaying a display component and a list of item names, the display component being used to perform an operation of changing number of rows included in the extraction guide.

19. A non-transitory computer-readable recording medium storing a plurality of instructions which, when executed by one or more processors, cause the processors to perform an image processing method comprising:
- displaying, on a display, a setting screen for setting an extraction area for extracting, from a tabular image, an item value for each of one or more extraction target items, the setting screen displaying, on the tabular image, an extraction guide representing the extraction area according to each of the one or more extraction target items, the setting screen further displaying, simultaneously, a first display component to perform an operation of increasing number of rows included in the extraction guide and a second display component to perform an operation of decreasing the number of the rows included in the extraction guide;
- receiving an operation of setting a position of the extraction guide on the setting screen by receiving an operation of one of the first display component or the second display component;
- generating a plurality of types of description definition information including individual company description information and business type description definition information, each of the plurality of types of the description definition information having a different level of priority for extracting among the plurality of types of the description definition information and including information representing a position of an area of a description item name in the tabular image, said information being associated with a keyword in the area of the description item name; and
- storing, the plurality of types of description definition information in a memory wherein the image processing method further comprises:
- specifying a type of business that generates a ledger sheet from which the tabular image is generated,
- extracting the extraction target items based on the individual company description information, and
- extracting the extraction target items based on business type description definition information that is associated with a specified type of the business upon determining that no extraction target item is extracted based on the individual company description information.

* * * * *